(12) United States Patent
Crain et al.

(10) Patent No.: US 12,434,951 B2
(45) Date of Patent: Oct. 7, 2025

(54) WINCH CONTROL SYSTEM

(71) Applicant: Polaris Industries Inc., Medina, MN (US)

(72) Inventors: Stephen G. Crain, Wyoming, MN (US); Jeremiah T. Johnstun, Elk River, MN (US); Timothy P. Norstad, Turtle Lake, WI (US); William J. Strnad, Wyoming, MN (US); Michael G. Vrudny, Lindstrom, MN (US); Nicholas R. Arens, Brooklyn Park, MN (US); Trevor F. Rhodes, Badger, MN (US); Michael C. Leighton, Excelsior, MN (US)

(73) Assignee: POLARIS INDUSTRIES, INC., Medina, MN (US)

( * ) Notice: Subject to any disclaimer, the term of this patent is extended or adjusted under 35 U.S.C. 154(b) by 907 days.

(21) Appl. No.: 17/096,212

(22) Filed: Nov. 12, 2020

(65) Prior Publication Data

US 2021/0139299 A1    May 13, 2021

Related U.S. Application Data

(60) Provisional application No. 62/934,819, filed on Nov. 13, 2019.

(51) Int. Cl.
| | |
|---|---|
| B66D 1/50 | (2006.01) |
| B66D 1/12 | (2006.01) |
| B66D 1/36 | (2006.01) |
| G08B 5/36 | (2006.01) |
| H02J 7/32 | (2006.01) |

(52) U.S. Cl.
CPC .............. B66D 1/505 (2013.01); B66D 1/12 (2013.01); B66D 1/36 (2013.01); G08B 5/36 (2013.01); H02J 7/32 (2013.01)

(58) Field of Classification Search
CPC . B66D 1/505; B66D 1/12; B66D 1/36; G08B 5/36; H02J 7/32
USPC .......................................................... 701/36
See application file for complete search history.

(56) References Cited

U.S. PATENT DOCUMENTS

| | | | | |
|---|---|---|---|---|
| 7,913,978 | B1* | 3/2011 | Trihey | B66D 3/006 254/323 |
| 9,014,913 | B2 | 4/2015 | Heravi et al. | |
| 10,093,523 | B2 | 10/2018 | Averill et al. | |
| 10,640,344 | B1* | 5/2020 | Hall | B66D 1/38 |
| 10,883,235 | B2* | 1/2021 | Norstad | E01H 5/063 |
| 2008/0224110 | A1* | 9/2008 | Starks | B66D 3/20 254/264 |
| 2008/0265830 | A1* | 10/2008 | Mir | B62D 5/0484 318/432 |

(Continued)

OTHER PUBLICATIONS

PWM—Pulse-width modulation, Soldered Electronics, 2024 (Year: 2024).*

(Continued)

*Primary Examiner* — Krishnan Ramesh
(74) *Attorney, Agent, or Firm* — SCHWEGMAN LUNDBERG & WOESSNER, P.A.

(57) ABSTRACT

A winch control system is disclosed. The winch control system may be used to control or operate a winch on a vehicle in a selected mode, such as a plow mode. The winch control system may include or receive input from selected sensors relative to the vehicle to assist in control and operation of the winch.

36 Claims, 26 Drawing Sheets

(56) References Cited

U.S. PATENT DOCUMENTS

| | | | | |
|---|---|---|---|---|
| 2012/0160143 | A1* | 6/2012 | Bailey | B63B 21/66 |
| | | | | 114/61.1 |
| 2014/0248992 | A1* | 9/2014 | Wehrwein | B60W 10/04 |
| | | | | 477/5 |
| 2015/0307332 | A1* | 10/2015 | Huang | B66D 1/28 |
| | | | | 254/323 |
| 2016/0046468 | A1* | 2/2016 | Heravi | B66D 1/54 |
| | | | | 715/835 |
| 2016/0096709 | A1* | 4/2016 | Averill | B66D 1/12 |
| | | | | 318/6 |
| 2016/0207418 | A1* | 7/2016 | Bergstrom | B60G 3/08 |
| 2016/0332554 | A1* | 11/2016 | Ambrosio | B62D 55/065 |
| 2017/0321851 | A1* | 11/2017 | Fretz | B63B 21/10 |
| 2018/0009549 | A1* | 1/2018 | Sullivan | B64F 1/027 |
| 2018/0072422 | A1* | 3/2018 | Shannon | B66D 1/60 |
| 2018/0175713 | A1* | 6/2018 | Fretz | H02K 11/25 |
| 2019/0023542 | A1 | 1/2019 | Averill et al. | |
| 2019/0077642 | A1* | 3/2019 | Huang | H02H 3/006 |
| 2019/0100314 | A1* | 4/2019 | Prager | B66D 1/485 |
| 2019/0135594 | A1* | 5/2019 | Brady | B66D 1/12 |
| 2019/0233262 | A1* | 8/2019 | Huang | B66D 1/12 |
| 2019/0241243 | A1* | 8/2019 | Rembach | B63H 21/20 |
| 2019/0292026 | A1* | 9/2019 | Felps | B66D 1/485 |
| 2019/0382248 | A1* | 12/2019 | Norstad | B66D 1/00 |
| 2020/0115202 | A1* | 4/2020 | Paoletti | B66D 1/485 |
| 2020/0182029 | A1* | 6/2020 | Romer | E21B 47/008 |
| 2020/0207592 | A1* | 7/2020 | Hall | B66D 1/36 |
| 2020/0207593 | A1* | 7/2020 | Hall | B66D 1/38 |
| 2020/0244091 | A1* | 7/2020 | Ehlert | B66D 1/525 |
| 2020/0255105 | A1* | 8/2020 | Torre | B63C 1/02 |
| 2021/0140130 | A1* | 5/2021 | Gallagher | H02P 6/30 |
| 2021/0284506 | A1* | 9/2021 | Moeller | B66C 13/105 |
| 2022/0009753 | A1* | 1/2022 | Noguchi | B66C 23/905 |
| 2022/0219953 | A1* | 7/2022 | Tanii | B66C 13/46 |
| 2022/0219954 | A1* | 7/2022 | Teranishi | E02F 9/24 |

OTHER PUBLICATIONS

Vishay Power Metal Strip Resistor, Vishay Intertechnology, Inc., 2 pages, 2012.

Hall Effect Current Sensors, Tamura Corporation., 2 pages, Mar. 2012.

Construction Vehicle Non-Contact & Shaft Encoders, Dynapar, 6 pages, Oct. 3, 2019. https://www.dynapar.com/industries/off_highway_vehicle/.

Dynapar Off-Highway & Specialty Vehicle Sensing Solutions, Where Accuracy Meets Durability, 2 pages, 2010.

* cited by examiner

WINCH CONTROL SYSTEM

CROSS-REFERENCE TO RELATED APPLICATIONS

This application claims the benefit of U.S. Provisional Application No. 62/934,819, filed on Nov. 13, 2019, entitled "WINCH CONTROL SYSTEM". The entire disclosure of the above application is incorporated herein by reference.

FIELD

The present disclosure relates to a winch control system, and more particularly, to a winch control system for a vehicle.

BACKGROUND

This section provides background information related to the present disclosure which is not necessarily prior art.

A vehicle made to use or traverse a selected area. The vehicle may include various drive or control systems such as a power plant which may include a gas powered engine or electric powered motor, and various control systems therefore. The vehicle may include a transmission and a steering control system, in various embodiments. Further the vehicle may include a selected number of wheels or tracks, such as a four-wheeled vehicle. The wheels are powered by the power plant to move the vehicle.

The vehicle may further include additional systems that are connected to and/or controlled by portions of the vehicle. Various control panels or mechanisms may be included to allow access or control of the systems by the user with the vehicle. The vehicle, for example, may include a powered winch to assist in various activities performed with a vehicle.

SUMMARY

This section provides a general summary of the disclosure, and is not a comprehensive disclosure of its full scope or all of its features.

A winch and plow control system for use in controlling a plow relative to a vehicle is provided. The system may include a display module having an input for receipt of a vehicle parameter, such as a gear selection. The display module may also include buttons for mode selection and manual control of the plow. The plow can be operated in a manual mode or a plow mode.

Disclosed are various control systems and mechanisms to control and/or augment operation of a winch system relative to a current or selected configuration of the vehicle. For example, the winch may be operated in a first configuration based upon an initial position or speed of a vehicle, a first position or power of the vehicle, or other vehicle parameters or statuses. Thus operation of the winch may be optimized or controlled for various purposes.

In addition, communication systems and/or sensors may be provided for providing inputs for controlling the winch. In various embodiments, the winch that may be operated and/or connected to the vehicle, may receive input or status information regarding the vehicle for operation and augmentation of the winch operation. Communication with the winch may be provided in various manners such as direct sensor input and/or vehicle communication systems.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
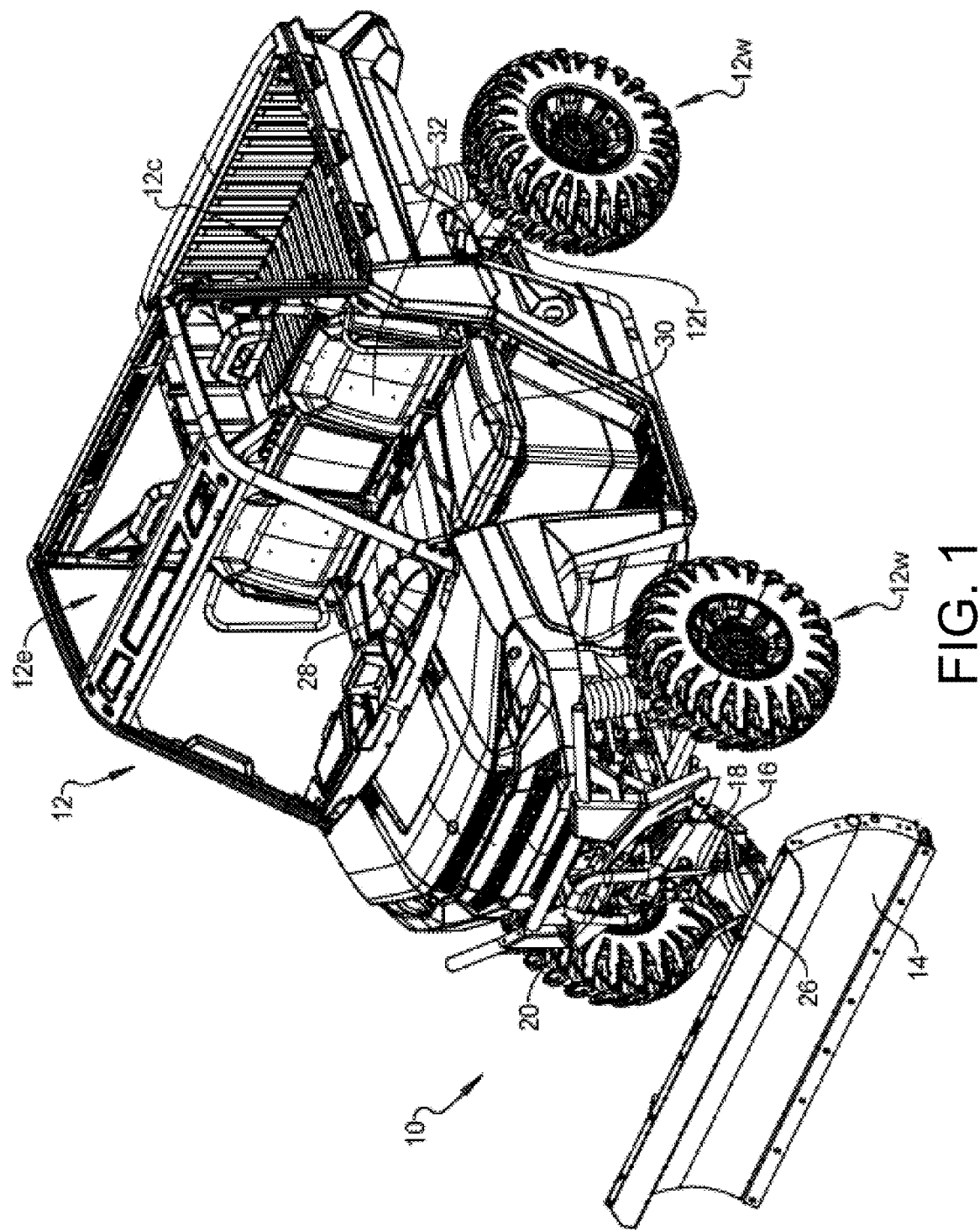
FIG. 1 is a perspective view of an off-road vehicle or utility vehicle having a winch and plow assembly of the present disclosure.
Figure 2:
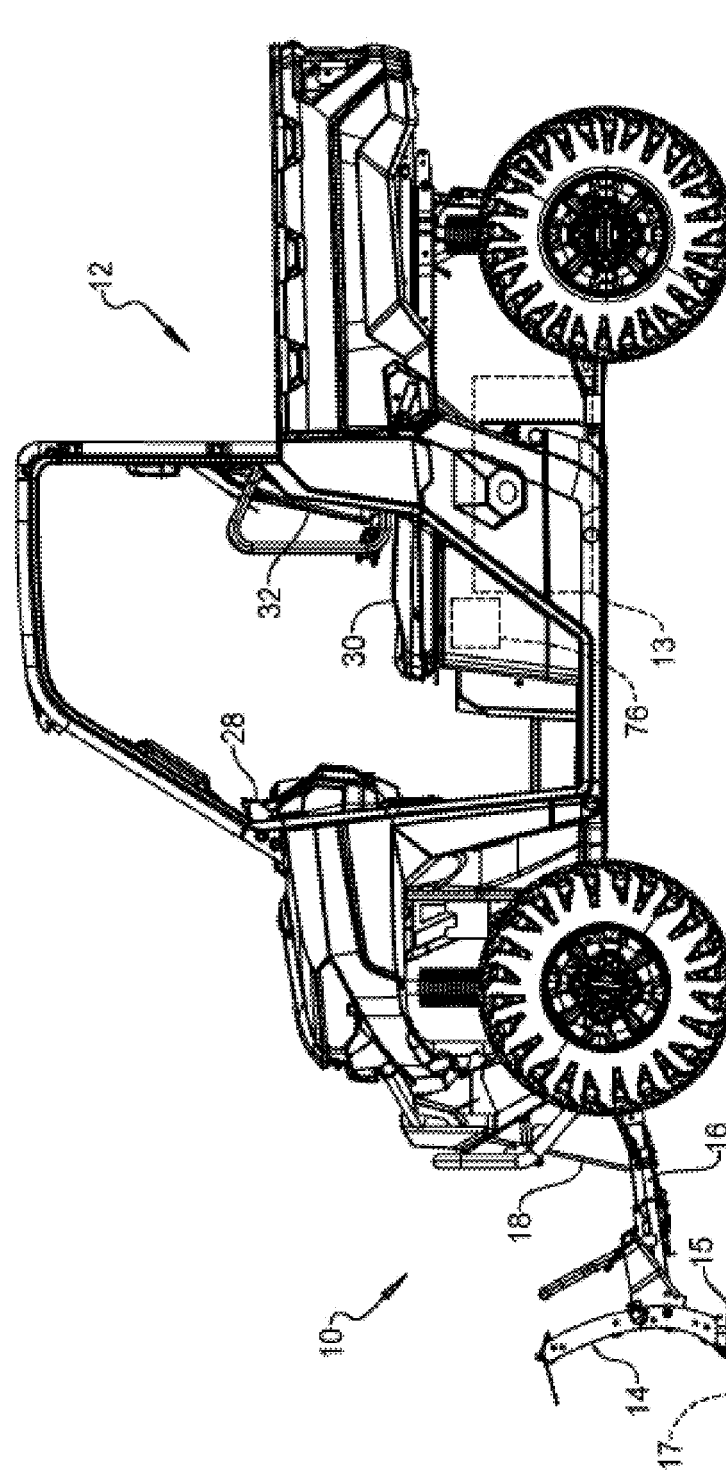
FIG. 2 is a side view of the vehicle of FIG. 1 with the plow shown in the down or lowered position.

FIG. 1 and FIG. 2 illustrates a winch and plow control system 10 shown associated with an off-road or utility vehicle 12. While the off-road vehicle 12 may be any appropriate off-road vehicle and may include a Polaris Ranger® utility vehicle, sometimes also referred to as a side-by-side vehicle. It is understood that any appropriate type of vehicle can utilize the winch and plow control system 10. For example, a plow associated with a Polaris Sportsman® all-terrain-vehicle (ATV) or other utility vehicle can also be controlled using the winch and plow control system 10. As illustrated in FIG. 1, a plow 14 is attached to the vehicle 12 by way of support arms 16 and is raised and lowered by way of a line 18, also referred to as a cable or rope. The line or cable 18 may be any appropriate line such as a polymer rope, natural fiber rope, steel cable, etc. The line 18 is attached to a winch 20 located within the front of the vehicle 12. The plow 14 can be the Glacier® Pro Plow and the support arms 16 can be the Glacier® ProPlow Frame, each offered by Polaris Industries of Medina, Minnesota. Any other plow or frame may also be operated and controlled with the winch and plow control system 10. The winch 20 can be a Polaris® HD winch with auto-stop, also offered by Polaris Industries Inc. of Medina, Minnesota, or any other appropriate winch 20.

The vehicle 12 may include various components, such as those understood by one skilled in the art. For example, the vehicle 12 may include ground or surface engaging portions, such as one or more wheels 12w. The wheels 12w may be rotatably connected to the vehicle 12 and or portions thereof, such as a vehicle frame or supports 12f. The vehicle 12 may further include a passenger or user compartment 12p and an auxiliary or cargo area 12c. The compartments may be carried on or connected to the frame 12. The vehicle 12 may further be powered by an engine 13. The engine may include an electric motor and/or gasoline powered engine, or other appropriate engine. Various components may further include an alternator or generator to generated electrical power and an energy storage system, such as a battery 15. The winch 20 may be powered by the battery 15 and/or any appropriate power source.

Figure 3:
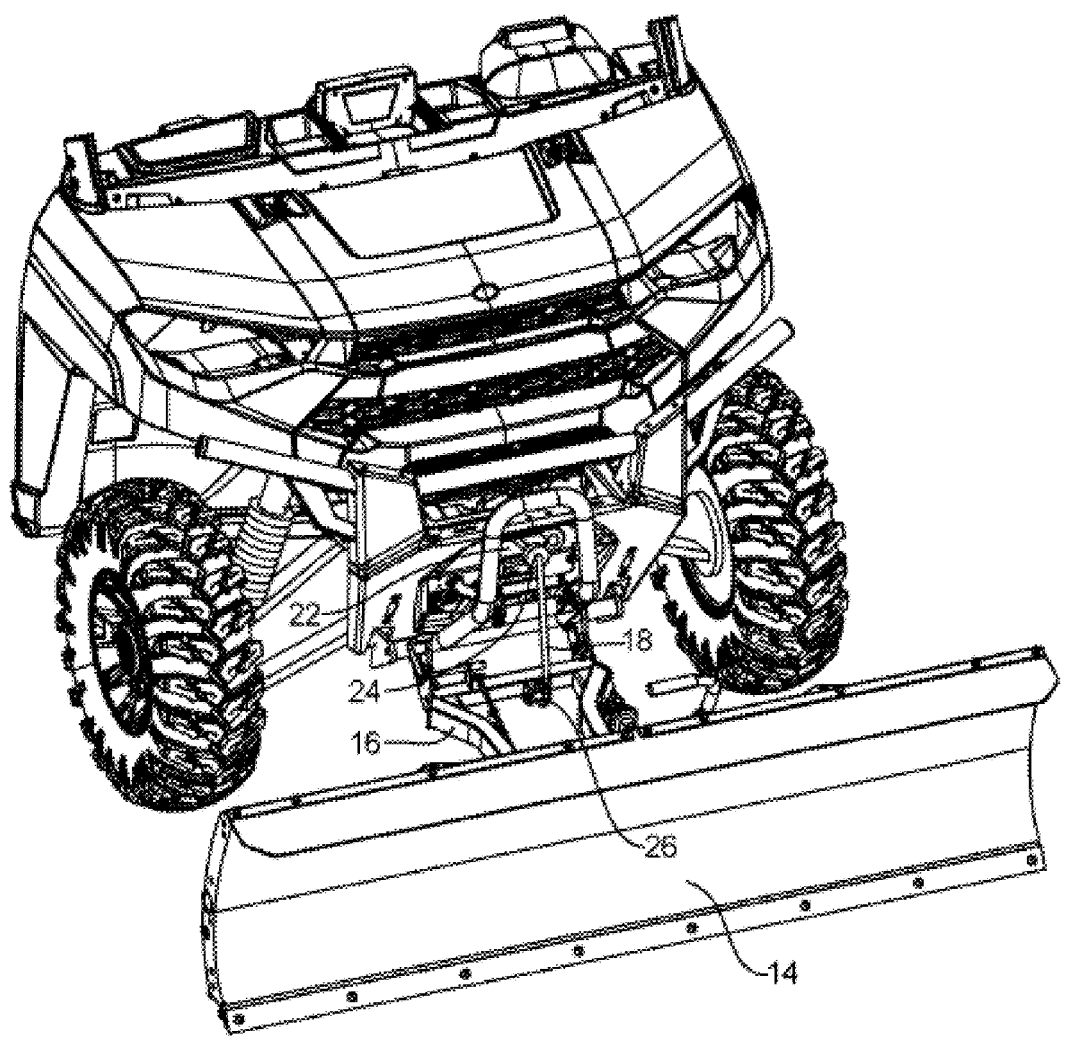
FIG. 3 is a perspective view of the plow assembly attached to the vehicle in the down or lowered position.
Figure 5:
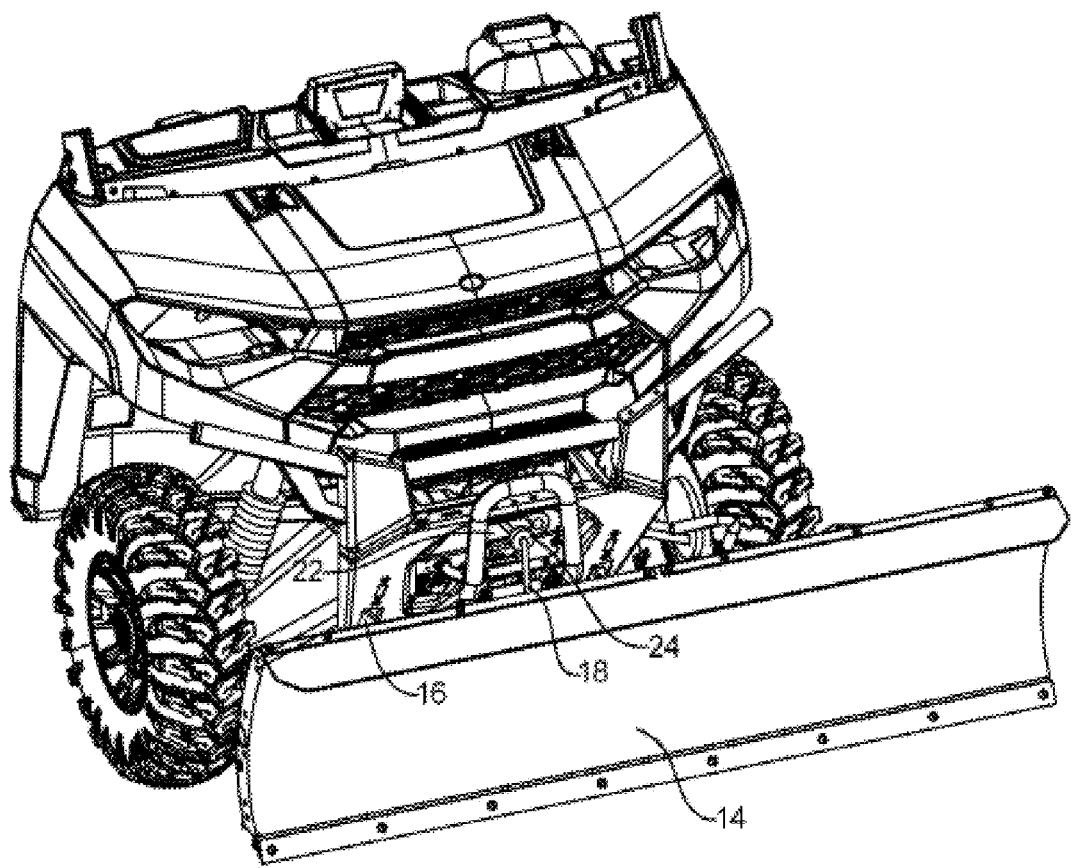
FIG. 5 is a perspective view of the plow assembly attached to the vehicle in the up or raised position.
Figure 6:
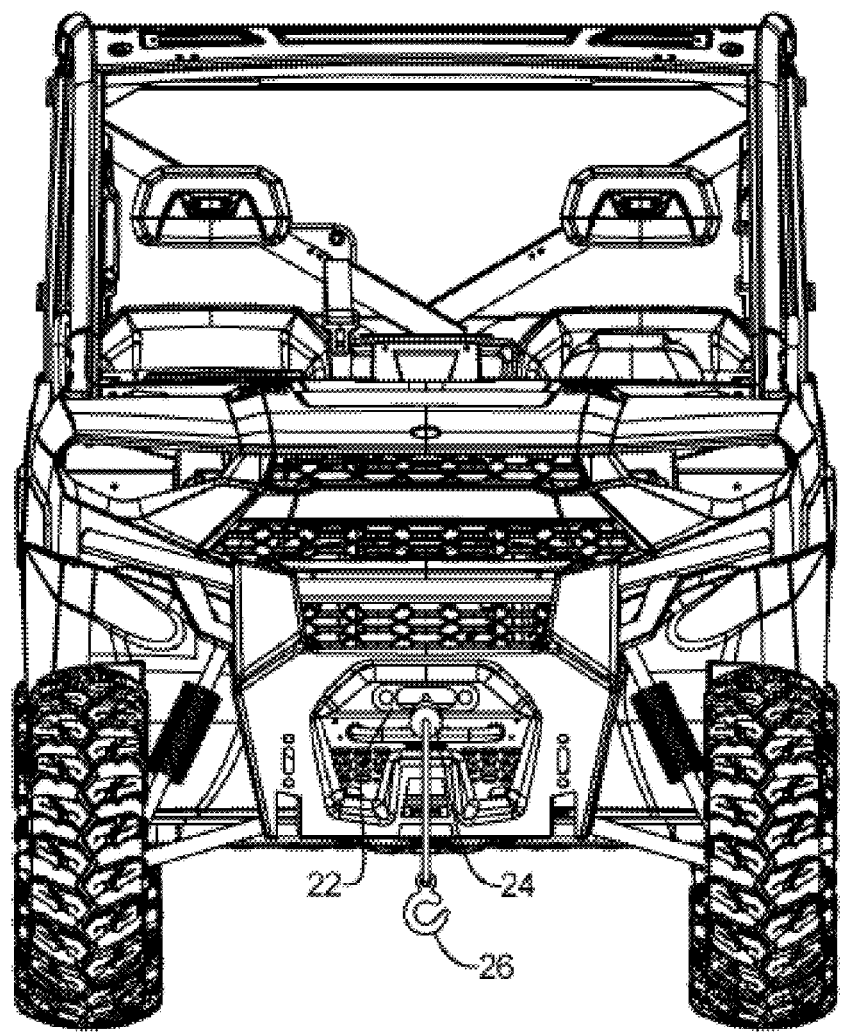
FIG. 6 is a front view of the vehicle illustrating an auto-stop assembly associated with the winch and plow assembly.

As illustrated more clearly in FIGS. 3, 5, and 6, a fairlead 22 is illustrated in the front of the vehicle 12 that may work with an auto-stop grommet or rubber bumper 24. At the distal end of the cable 18 may be a hook 26 that couples to the support arms 16 to enable the support arms 16 to raise and lower the plow 14, via the winch 20 and cable 18. To assist in and/or control the raising and lowering of the plow 14, a control system may include a display 28 associated with the vehicle 12. The display 28 include an interface for a user of the vehicle 12 to control the winch 20, as well as raise and lower the plow 14. Also associated with the operation of the plow 14 can be an optional operator presence switch 30 that can be embedded in a driver seat 32 to optionally allow for raising and lowering the plow 14 only during the presence of a driver or user in the vehicle 12 positioned within the driver seat 32. The optional operator presence switch 30 can also be associated with the shift lever or other control to detect the presence of a user for use in controlling the plow 14.

Figure 4:
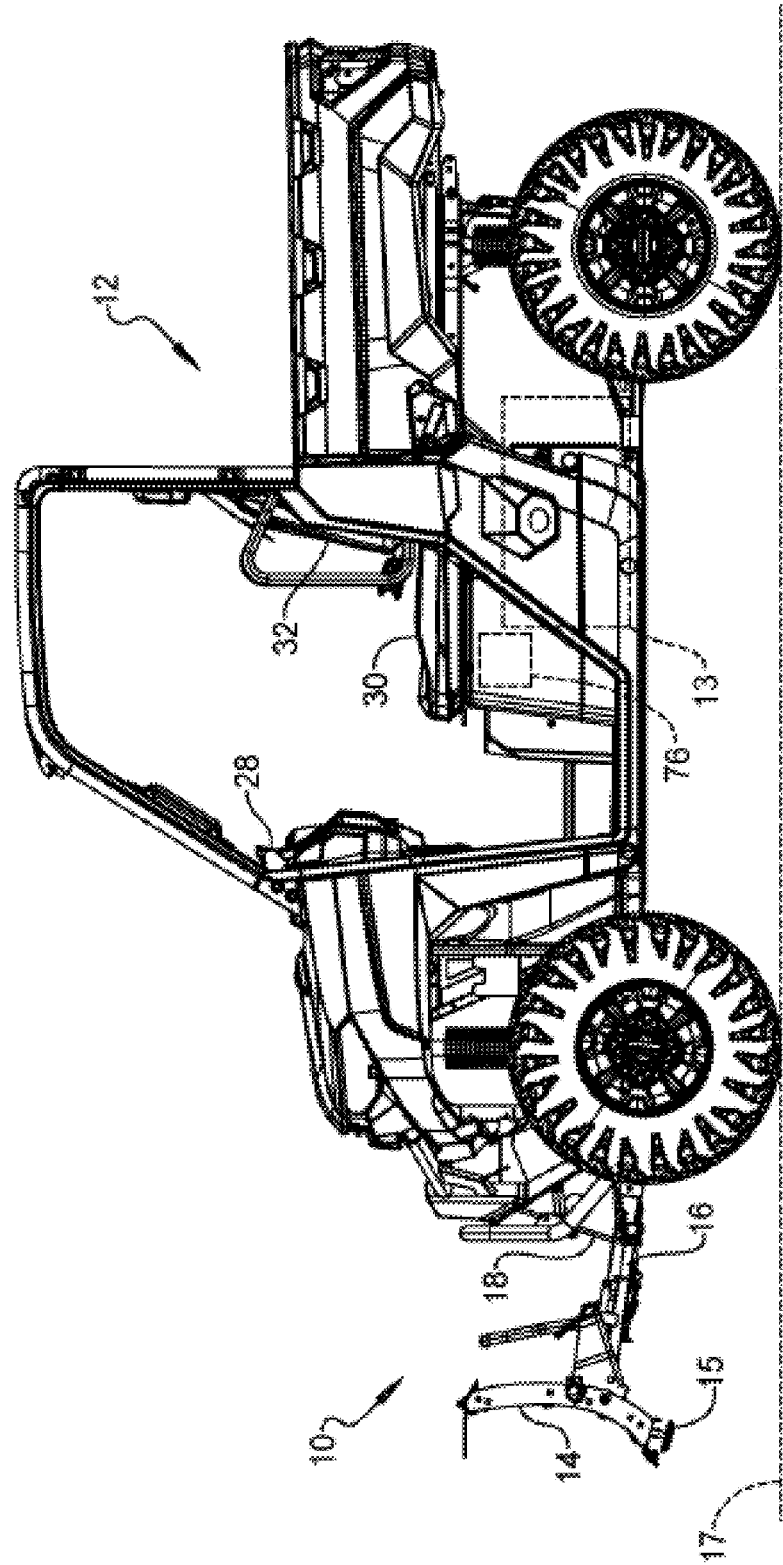
FIG. 4 is a side view of the vehicle of FIG. 1 with the plow shown in the up or raised position.

As illustrated in FIGS. 2 and 3, the plow 14 is shown in the down or lowered position, such as including portions or bumpers 15 that contact a surface or road 17. In this position, the plow 14 can be used to either push snow or debris when the vehicle 12 is moving forward. Alternatively, the plow 14 can be used to pull debris away from an area, such as a garage door, when the vehicle 12 is moving in reverse or backwards. FIGS. 4 and 5 illustrate the plow 14 in a raised or up position relative to the vehicle 12. In this condition, the vehicle 12 can be moved either forward or in low gear or backwards or reverse gear to move to a desired location without the plow 14 engaging snow or debris. In the raised position, for example, the bumpers 15 need not or do not contact the surface 17. Further discussions of the manual and automatic raising and lowering of the plow 14 will be discussed further herein.

Figure 7:
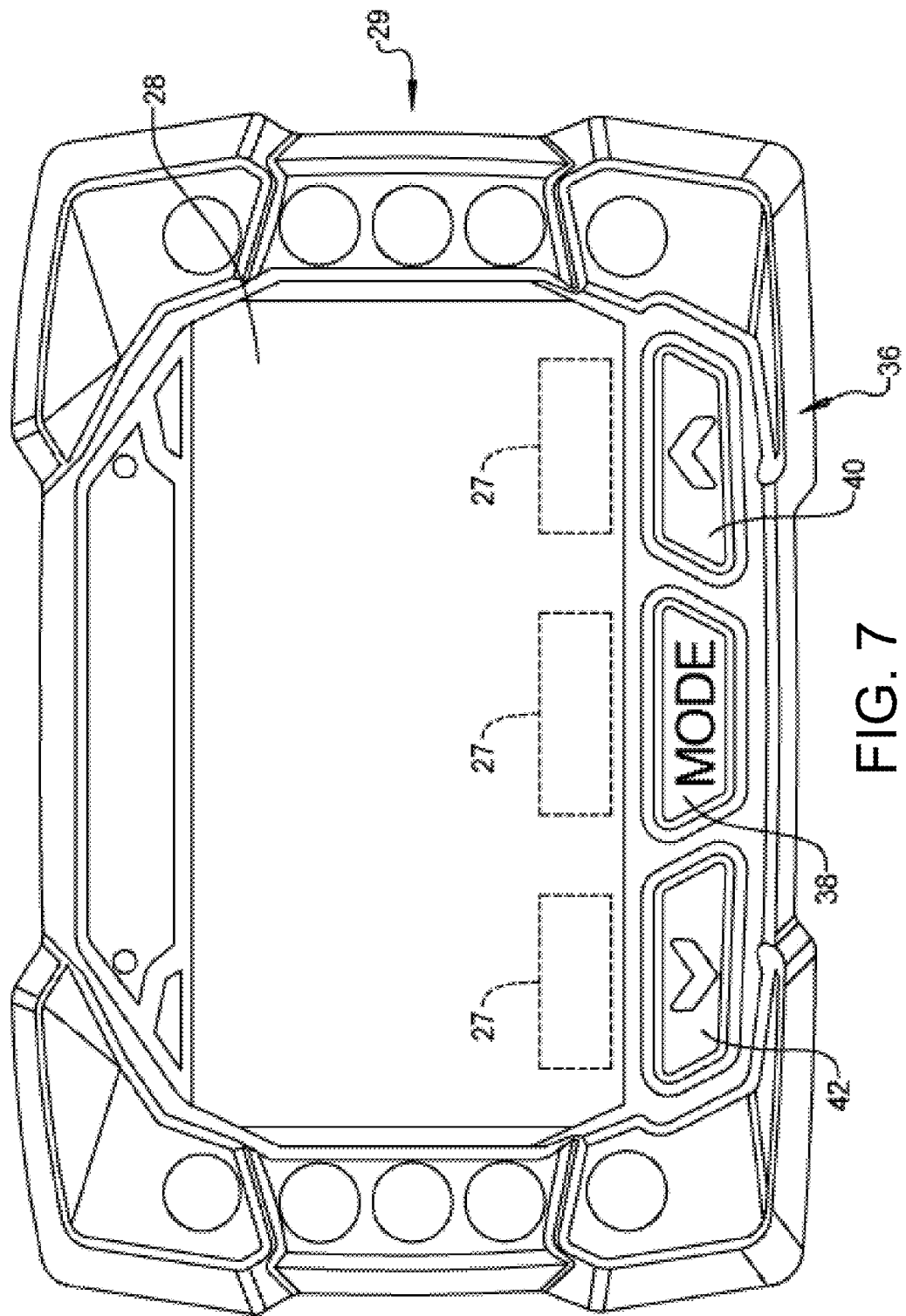
FIG. 7 is an illustration of the display used in the present disclosure, as well as the plow and mode controls in the display.

The display module 28, further illustrated in detail in FIG. 7, includes a display screen 29 includes a physical button interface, which may include a three-button interface 36 that may be used to control the winch 20 and plow 14. As illustrated in FIG. 7, the three-button switch 36 includes a mode switch or button 38 that can be toggled to switch between various modes for controlling the winch 20 and plow 14. Modes may a plow mode or a non-plow mode (e.g. recovery mode). Other modes may include an automatic plow mode normal operation and automatic plow mode backdrag operation or mode or a manual mode. In the manual mode, an up arrow button 40 can be actuated to raise the plow 14 and a down arrow button 42 can be actuated to lower the plow 14. The display module may further include a touch display with one or more soft buttons 27 for control of various features of the winch 10.

By providing the display module 28, there is no need to provide a separate switch assembly for controlling the plow and the plow can be controlled, via another existing display module on the vehicle 12. The display module 28 may also provide other information to a user as discussed further herein including a vehicle speed, engine rotation per minute (RPM), fuel level, and engine parameters (e.g. engine temperature, pressure, etc.).

Accordingly, in a winch control mode, or "winch mode", the winch can be manually controlled via the up switch 40 and the down switch 42 to spool the cable 18 either in or out, depending on the user's desire. The winch 20 may also be controlled remotely, as further discussed herein. In the plow mode, the user can either manually adjust the plow upward or downward with the up switch 40 and down switch 42. Alternatively, in the auto plow mode, the plow 14 can be controlled via a processor and the display 28, as further discussed herein.

Figure 8:
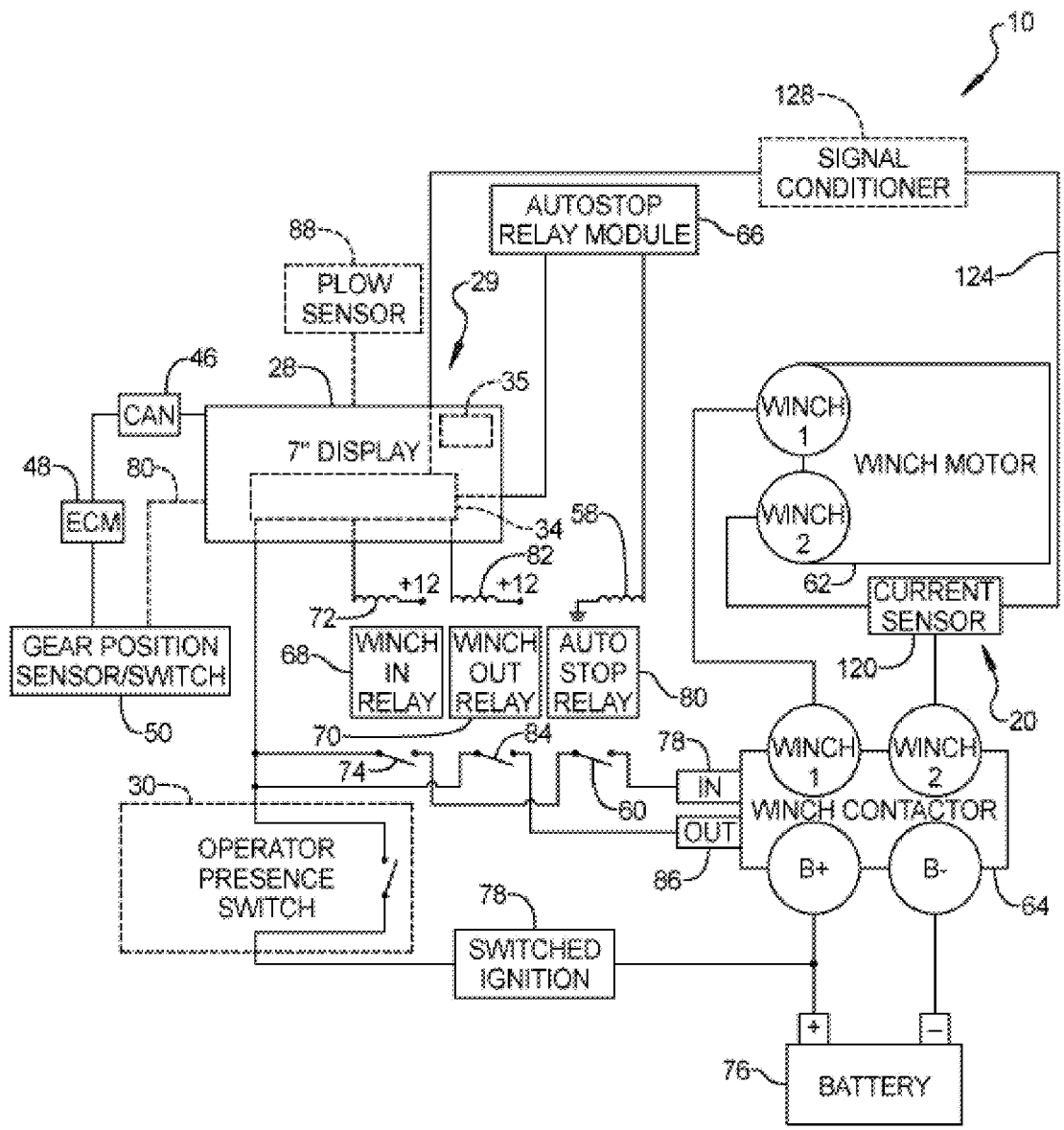
FIG. 8 is a schematic of a control system for a winch assembly, according to various embodiments.

Referring to FIG. 8, a schematic block diagram of at least a portion of the winch and plow control system 10 is illustrated. In various embodiments, the optional hard-wired operator presence switch 30 is illustrated. If selected, the optional switch 30 can be eliminated and the switch 30 could be replaced with a hard wire acting as an always closed switch. The winch and plow control system 10 includes the display 28. Associated with the display 28 may be one or more of a processor or a controller 34. It is understood that the processor 34 may be incorporated into the display 28, incorporated into a vehicle engine control module (ECM) 48 (FIG. 8), or a separate processor with the vehicle 12. The display module 28 may reference, in various embodiment, a combination of the processor 34, the display 29, and other portions such as a memory including selected instructions for operation of the winch 20.

In various embodiments, as illustrated in FIG. 8, the system 10 may operate with an existing Polaris® HD winch having various features, such as an auto-stop feature that turns off the winch 20 as the cable 18 is retracted into the winch 20. The auto-stop feature may include a relay module 66 and receives a signal from a switch at the fairlead, or other appropriate portion that indicates that the cable 18 is fully in. The relay 66 may operate a solenoid 58 at an auto-stop relay 80 and close a switch 60. Thus, the winch system 10 may include an auto-stop or auto-off function with a switch or sensor at the fairlead 22.

In various embodiments, a winch motor 62 of the winch 20 may be automatically and/or user controlled via the display module 29. The display 28 or processor 34 provides a pair of low side drivers that are in association with a winch-in relay 68 and winch-out relay 70. For example, when the vehicle 12 is put into reverse, gear position sensor 50 senses this location and provides this information either directly through an analog input 80 or through a CAN bus 46 to the display module 29, via the ECM 48. It is understood by one skilled in the art that the CAN bus 46 may be used in addition to and/or alternatively with other communication systems, such as an Ethernet or other wired or wireless communication systems or protocols. Thus, any appropriate communication system or protocol may be used in addition to and/or in place of the CAN bus 46. The display module 29 having the processor 34 provides ground to solenoid 72 thereby closing switch 74 of relay 68 to deliver 12 volts from the operator presence switch 30, if present, to a winch contactor 64. This 12 volts is delivered via a battery 76 through an ignition switch 78. It is understood that the winch contactor 64 need not be separate from the winch motor 62, but may be incorporated therein and/or directly connected to the winch motor 62. The illustration in the various figures, including FIG. 8, is schematic. Further, as discussed herein, the winch motor 62 may include a brushless and/or permanent magnet and may include incorporated controls separate and/or alternative to the winch contactor 64.

With the switch 74 closed and a switch 60 closed, 12 volts is delivered to a winch-in input 78 of winch contactor 64 to deliver and provide positive (+) polarity of 12 volts on winch contact 1 and a negative (−) polarity on winch contact 2 to the winch motor 62. In various embodiments, as understood by one skilled in the art, the winch contactor 64 is an H-bridge that switches polarities to the winch motor 62 to drive the winch motor 62 in one of two directions. During the winch-in direction, the winch 20 is turned to draw the cable 18 into the winch 20 and during the winch-out the winch is turned to release or let out the cable 18.

When the gear position sensor switch 50 senses a forward or low gear, this signal is also sent to the display module 29, via the CAN bus 46 or directly via the analog input 80, in order to provide ground to solenoid 82 to close switch 84 of the winch-out relay 70. This provides 12 volts to the winch-out input 86 of winch contactor 64 thereby providing a positive (+) polarity to the winch 2 output and a negative (−) polarity to the winch 1 output to lower the plow 14 by running the motor 62 in the winch-out direction.

Thus, the winch system 10 may be operated in various modes, such as a plow mode. The winch system 10, however, may also be used to operate or control the winch in other various configurations. For example, the winch may receive input from various sensors or vehicle sensors to determine whether to operate the winch or to stop operation of the winch. Thus, operation of the winch 20 may be based on selected inputs directly from the user or automatically, without user input, such as with input from sensors or operation of the vehicle 12.

As described above, the winch control system 10 may be incorporated into the vehicle 12 for operation and control of the winch motor 62. In various embodiments, the winch control 10 may include a current sense system or module 120. The current sense module 120 may be connected to a line or connection 124 from the winch contactor 64 to the winch motor 62. As discussed above, the winch contactor 64 is understood to be an H-bridge that operates the winch motor 62 in either an in-direction or an out-direction (e.g. in two spinning directions) for operation or movement of the cable 18.

The current sensor 120 may be any appropriate type of current sensor such as a low resistance current shunt, a bidirectional hall effect current sensor, or other current sensing device. The winch motor 62 is generally connected to a DC current supply, such as the battery 76, therefore a DC current sensing system may be provided. In various embodiments, the current sensor may include a current or shunt resistor such as a Power Metal Strip® Shunt Resistor (WSBS8518 sold by, Vishay Intertechnology, Inc. having a place of business at Shelton, Connecticut). Additional current sensors may include a Tamura hall-effect sensor such as from the L01ZS05 series sold by Tamura Corporation, having a place of business at Tokyo, Japan. It is understood that the exemplary embodiment current sensors, as discussed above, are merely exemplary and any appropriate sensor may be used.

The current sensor 120 may sense a current between the winch contactor 64 and the winch motor 62. The polarity of the current, when a DC motor is used as a winch motor 62, may be used to determine a direction of the motor, such as an up or down position. The up or down may also be referred to as an in or out. In various embodiments, such as those discussed above, the in or out may refer to an up or down of the plow 14. Accordingly, winding the Winch in will raise or move the plow 14 in an up direction and winding or unwinding the winch out will lower or move down the plow 14.

Regardless of the type, the current sensor 120 may send a signal to the control or display module 29. As discussed above, the display module 29 may include the processor 34. The display module 29 may further include various components, such as a memory portion 35. The memory portion 35 may include logical instructions that may be accessed (e.g. recalled) and executed by the processor system 34. It is further understood that any appropriate processor system may be provided with the vehicle 12, the control system on the winch motor 62, or other appropriate location. Nevertheless, the processor 34 may execute instructions based upon the signal and interpret the signal from the current sensor 120.

In various embodiments the signal from the current sensor 120 may first be conditioned at a signal conditioning or conditioner module 128. The signal conditioning module 128 may condition the signal from the current sensor 120 such as to scale and filter the signal from the current sensor 120. It is understood that the winch motor 62 may cause interference and conditioning the signal may allow for understanding of the signal from the current sensor 120 more accurately after being filtered or conditioned with the signal conditioner 128. Selected conditioning may include generating or incorporating a blanking leading edge to ensure that a current in-rush from the initial motor current does not trigger a stop signal, according the lodging as discussed further herein.

It is understood that the signal conditioner 128 is optional. In various embodiments, the signal from the current sensor 120 may be provided directly to the processor system 34 of the display module 29. Further, it is understood that any appropriate processor system may be provided to process the signal from the current sensor 120.

Figure 9:
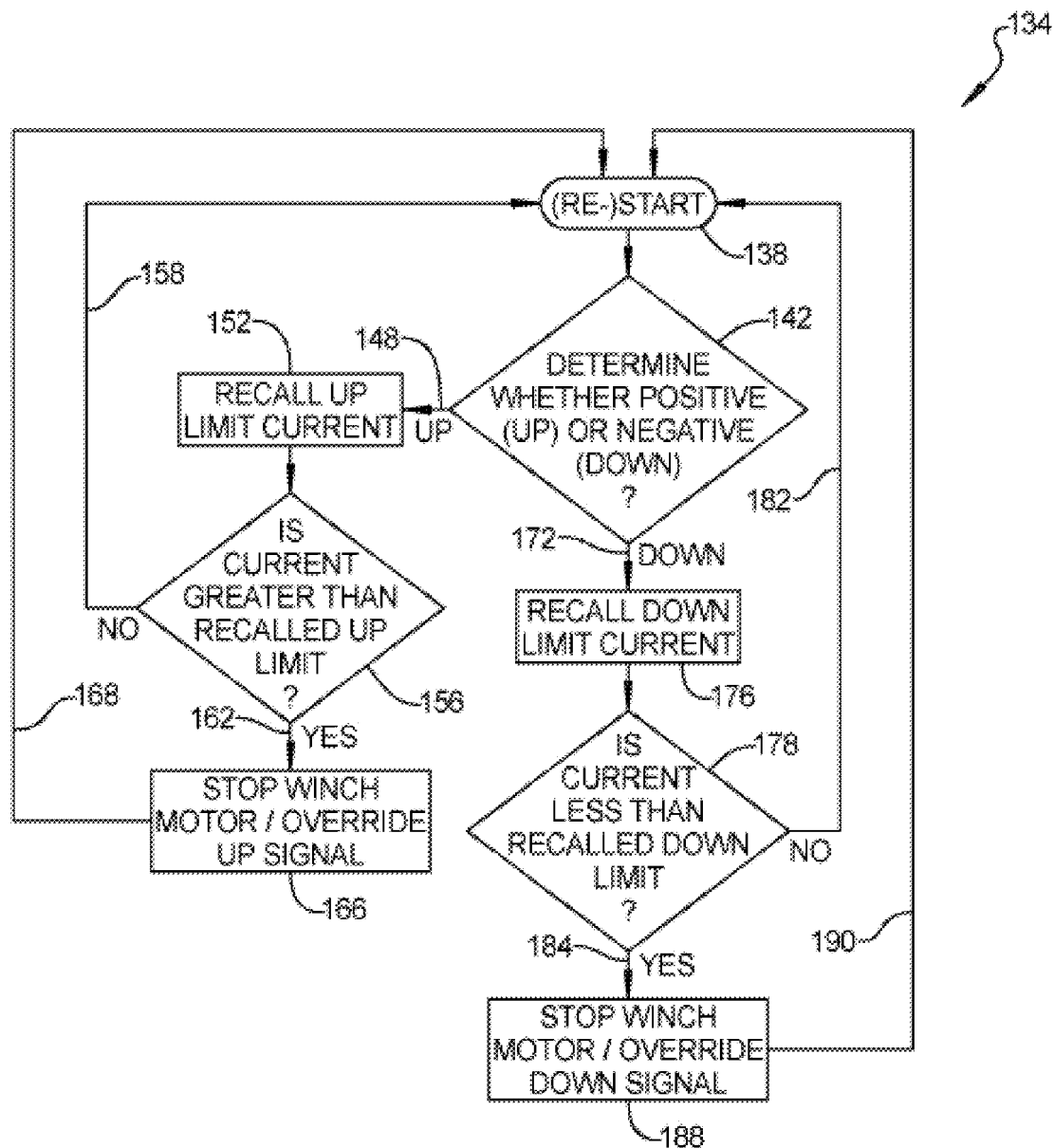
FIG. 9 is a flowchart of a process of operation of a winch assembly, according to various embodiments.

In various embodiments the operation system 10 may determine whether to stop operation of the winch motor 62, such as by stopping current thereto, via a selected logic as illustrated in FIG. 9. As discussed above, and illustrated in FIG. 8, a signal may be received by the processor system 34. Accordingly, the signal may be processed and analyzed, according to the flow diagram 134 illustrated in FIG. 9. The flow diagram 134 may start at start block 138 which may include initializing the processer 34 after receiving the signal from the current sensor 120 and/or the signal conditioning system 128.

After starting in block 138, a determination of whether a positive current or up motion is received or a negative current or lowering signal is received in block 142. The determination of whether the current is positive (up) or negative (down) may be used for determination of comparison to a selected or preset limit. In various embodiments, as discussed above, the current may be positive or negative based upon the direction of the winch motor, and may allow for or require comparison to different limits for selected operation of the winch motor 62.

Once a determination is made in block 142 of whether an up or down signal is received in the start block 138, the process 134 may continue. For example, if an up signal is determined an UP path 148 is followed. The system or process 134 may recall or access an up current limit in block 152. The up current limit may be a maximum current limit that may be predetermined or determined with the system to determine either a maximum up position or a stuck/binding condition of the plow 14. In various embodiments, for example, the plow 14 may be selected to be raised to a specific or predetermined position. At a selected position, the plow 14 may stop and the motor 62 may attempt to continue to turn the drum or spindle of the winch 20. If the plow 14 is stopped (e.g. due to binding or a maximum physical position of the plow) the current may increase as the plow 14 is attempted to be raised, but the motor 62 is not able to turn. A predetermined up limit or positive limit may be made and stored, such as in the memory 35, for recall by the processor 34. The recall of the up limit in block 152 may be used for comparison to the received signal from the current sensor 120 in block 138. The comparison may be made in block 156 to determine whether the sensed current is greater than the recalled up limit. If a determination that the sensed current is not greater than the recalled up limit, a NO path 158 may be followed to block 138. Thus, the system may loop if it is determined that the sensed current is not greater than a limit in block 156.

If the up limit is reached, such that the sensed current is determined to be greater than a recalled up limit, a yes path 162 may be followed to stop the winch motor or override an up signal in block 166. The stopping of the winch motor in block 166 may allow for the winch motor 62 to stop when the current is sensed to be greater than a predetermined limit. Accordingly, the user of the vehicle 12 may have the user input overridden if the limit is determined to be reached or exceeded for various purposes.

Stopping the winch motor 62 may be performed for various reasons. For example, it may be used to reduce wear on the winch motor 62 and/or stress on the cable 18. Further the stopping of the winch motor in block 166 may be used to minimize damage due to binding or an obstruction of movement of the plow 14, operation of the winch motor 62, or other issues.

After the winch motor is stopped in block 166 the process may continue in block 162 to start 138. Thus, the process 134 may be a continuous loop during operation of the winch 20 and/or operation of the vehicle 12. The control or protection loop 134 may allow for determination of proper or selected operation of the winch 20 by the winch control system 10 assist in maintaining and/or extending life of the winch 20.

The determination block 142 may also determine that the signal is a down or negative signal and may then proceed along the DOWN path 172 to recall a down limit current in block 176. The down current limit may also be predetermined and stored in a selected memory, such as the memory 35. The down limit 176 may be any appropriate current limit and may be a minimal or low current based upon the plow 14 having reached a lowest position and/or reached a surface, such as the surface 17 discussed above. The load on the winch motor 62 may then be decreased or minimized, such as at a selected rate.

The recalled down limit may then be compared to the sensed current in block 178. The comparison may be whether the sensed current is less than the recalled down limit current. As discussed above, the current may be decreased or minimized when the load on the motor is decreased due to the plow 14 not being held by the cable 18, but rather by a surface on which the plow rests (e.g. surface 17). Accordingly, the determination in block 178 may be whether the sensed current is less than a recalled down limit.

If the sensed current is not less than the recalled down limit, a no path 182 may be followed to the start block 138. Thus, the process 134 may loop to continually monitor the sensed current with the current sensor 120. If the current is less than the recalled down limit, a yes path 184 may be followed. If the yes path 184 is followed the winch motor 62 may be stopped or the down signal or input of the user will be overridden in block 188. Similar to stopping the winch motor in block 166, stopping the winch motor in 188 may assist in increasing life of the winch motor 62, minimizing the amount of cable 18 let out, reducing possible binding, or other complications.

Once the winch motor is stopped in block 188, the system may again loop to the start block 138 along path 190. Accordingly, the current sensed control loop 134 may continually monitor operation of the winch motor 62 during selected operation of the winch motor 62 and/or operation of the vehicle 12. In various embodiments, the control system 10 may be active during operation of the vehicle 12 and/or during selection of selected modes, such as a plow mode, recovery mode, or the like of the winch 20. Nevertheless the process 134 may be a continuous loop to allow for continuous monitoring of the operation of the winch motor 62 with the current sensor 120.

In various embodiments, the winch motor 62 may be a motor that incorporates an internal current sense 120. For example, returning reference to FIG. 8, the winch motor 62 may be a DC brushless motor or a permanent magnet AC motor that includes an internal current sense 120'. The internal current sense 120' may be incorporated into a control system of the motor, such as a brushless DC motor. The internal current sense 120' may transmit a signal along the signal line to the signal conditioner 128 and/or to the processor 34. The current sensor, therefore, may be provided by any appropriate current sense system such as the external current sense 120 and/or an internal current sense 120'. The current sense signal may, therefore, regardless of its origin, be provided to the processor system 34 for use in the process 134.

Figure 10:
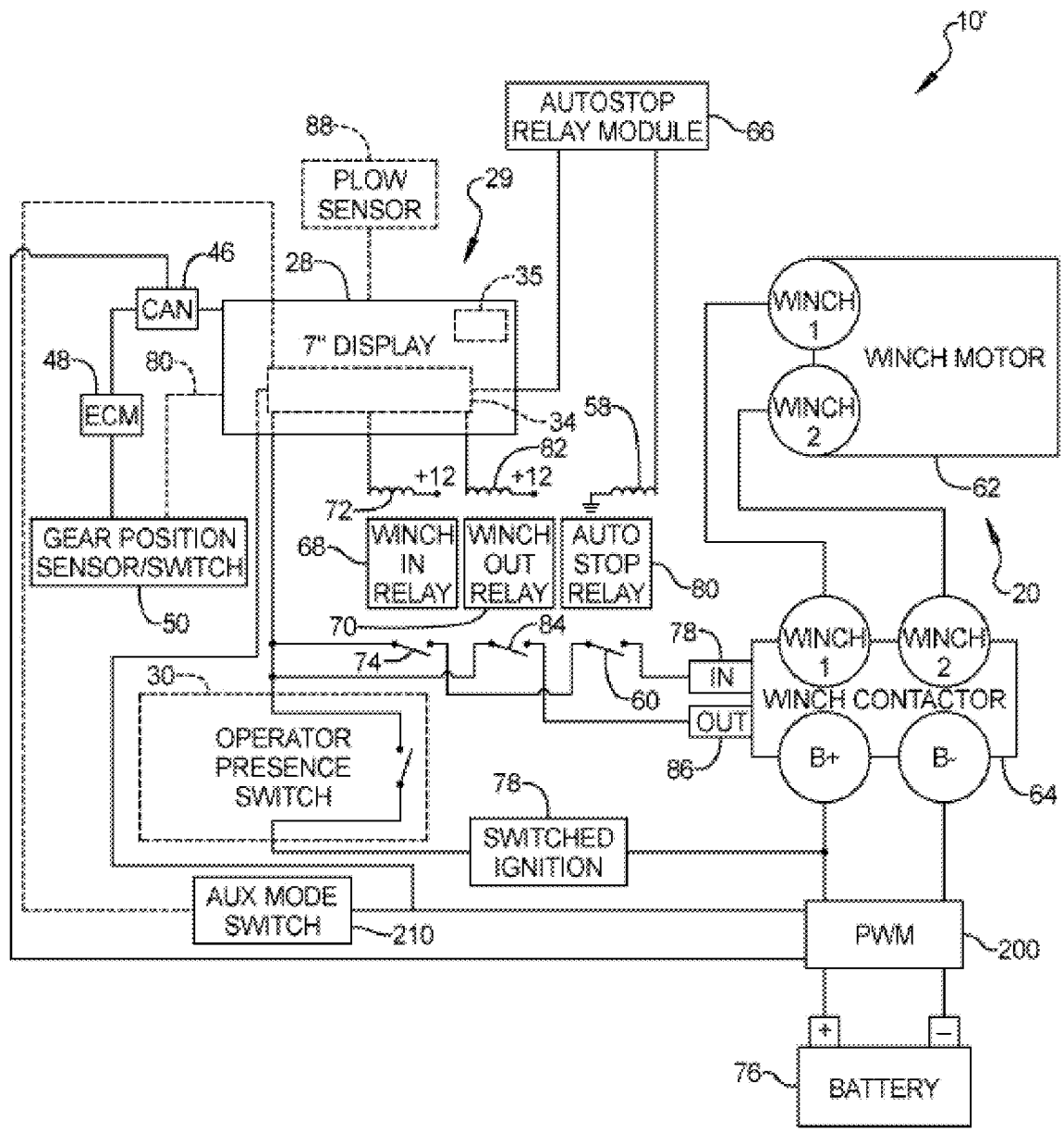
FIG. 10 is a schematic of a control system for a winch assembly, according to various embodiments.

Turning reference to FIG. 10, a control system 10' is illustrated. The control system 10' may include components that are similar to those discussed above, where similar reference numerals refer to like items or components. In addition, it is understood that the control system 10' may include or incorporate features illustrated in other control systems, as discussed herein, including those discussed above, such as a current sensor 120. Nevertheless, the control system 10' may include additional and/or alternative control or sensor portions, such as a pulse width modulation (PWM) component 200. The PWM 200 may also be referred to as a controller or motor controller to control various portions, such as the winch motor 62. The PWM 200 may receive instructions and/or control logic from various components such as from the processor 34 and/or an auxiliary control switch 210. In addition, the control of the PWM may be directly from the auxiliary mode switch 210, the processor 34 of the display module 29, or communication through selected communication networks, such as the CAN bus 46. Thus, the PWM 200 may be controlled through inputs from various systems in appropriate manners.

As discussed above, the display module 29 may include one or more switches, that may include hard switches and/or soft switches (e.g. changeable touch screen switches). The auxiliary mode switch 210 may include or be provided in the vehicle 12, such as in a three-way toggle switch that may be used to control the winch motor 62 and/or select a mode for the winch 20. Nevertheless, the auxiliary mode switch 210 may provide an input to the PWM controller 200 through the processor 34 and/or directly to the PWM 200. The PWM 200 may be used to provide selected input to the winch motor 62 through the contractor 64.

The PWM 200 may be any appropriate PWM including a KDS—Mini Brushed DC Controller (e.g. Part Number KDS24200E) sold by Kelly Controls, Inc. having a place of business at Valencia, CA, USA and/or motor controllers (e.g. Model 1216 and/or model 1220) sold by Curtis Instruments, Inc. having a place of business at Mount Kisco, New York, USA. The PWM 200 may operate to provide selected duty cycles to the winch motor 62 through the winch contactor 64. As discussed above, the winch contactor 64 may be used to operate the winch motor in an in or out direction, as illustrated and described in the control system 10. Accordingly, the winch motor 62 may be operated at a selected duty cycle up to a maximum of 100% duty cycle based upon the pulses from the PWM 200.

Figure 11:
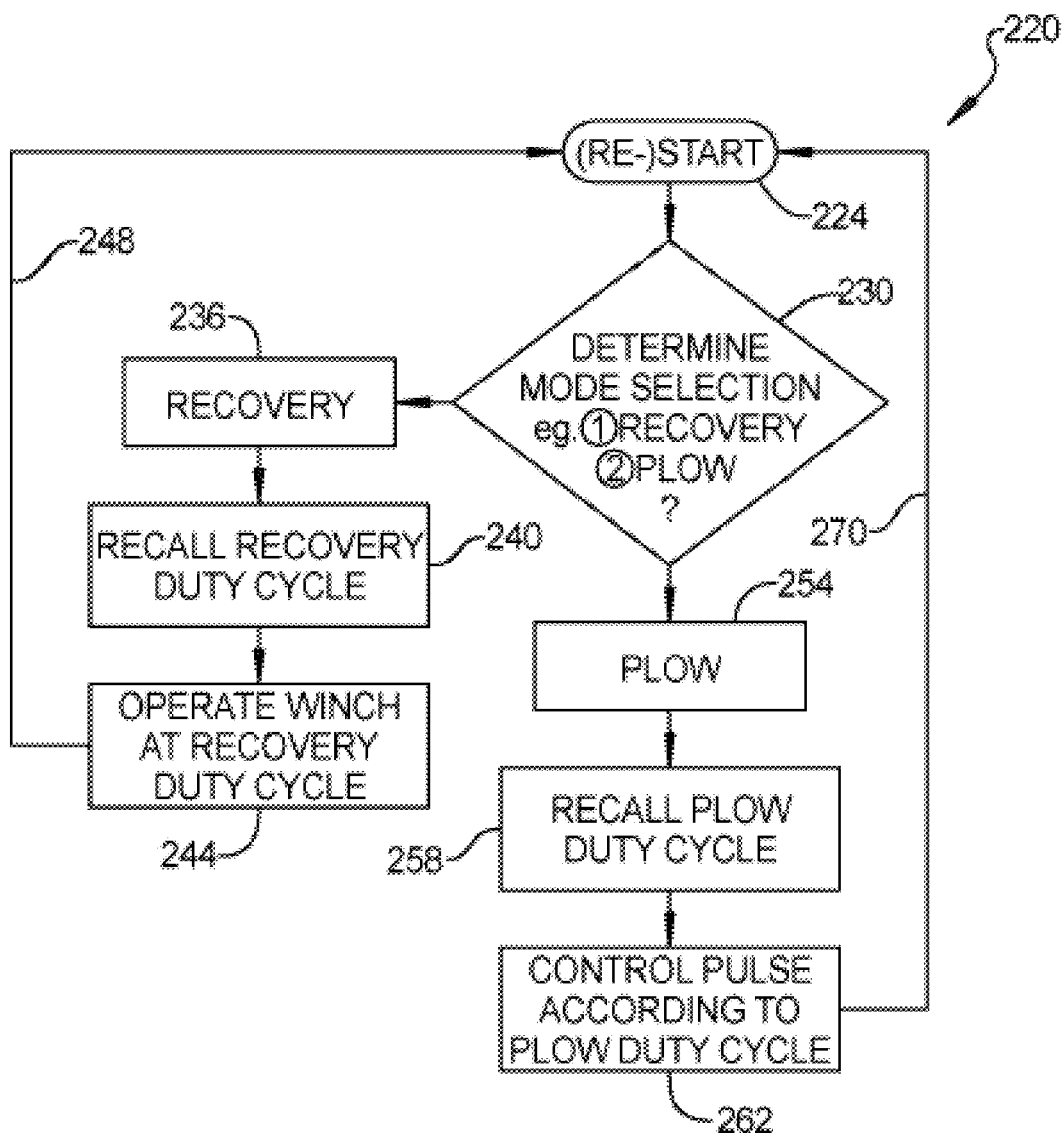
FIG. 11 is a flowchart for operation of a winch assembly, according to various embodiments.

The PWM 200 may be used to operate the winch motor at a selected duty cycle based upon selected or appropriate inputs, including mode selections for the winch 20. For example, the PWM 200 may operate at a selected duty cycle according to a selected logic, including the logic 220 as illustrated in FIG. 11. The process or control logic 220 may begin at start block 224. The start block 224 may be any appropriate start block, such as receiving a signal from the user from any appropriate system (e.g. the display module 29). The process 220 may then move to a determination block to determine a mode selection in block 230. The mode determination selection in block 230 may be a selection of any appropriate mode and the illustration of modes in the process 220 is merely exemplary.

As exemplary illustrated in FIG. 11, therefore, the determination may be between a recovery mode and a plow mode. The PWM 200 may operate the pulses to the winch contactor 64 in an appropriate or selected duty cycle based upon selected modes. Accordingly, for example, the determination block 230 may be determination of a recovery mode and a recovery path 236 may be followed. The selection may be based upon an input of the user, such as via the display module 29.

After determining that a recovery mode is selected and following the recovery path 236, a recall or recovery duty cycle may be made in block 240. The PWM 200 may then operate at the recovery duty cycle in block 244 and operate to provide pulses to the winch contactor 64, and therefore to the winch motor 62, according to the recalled duty cycle in block 244. After operating the winch at the recovery duty cycle 244, a loop path 248 may be followed to the start block 224. The loop path 248 allows for the determination of a change in motor operation of the winch 62 by the user, such as stopping operation of the winch, determination of various other inputs or sensors, or the like.

In various embodiments operation of the winch at a recovery duty cycle may include a selected ramp up to a selected duty cycle. For example, a user may select or desire to have the winch operate at a full speed and power during a recovery for ease of recovering a vehicle. Thus, the duty cycle may ramp up from 0% to 100% in a short period of time (e.g. about 0.5 to about 3 seconds) to provide for fast recovery of the vehicle 12. It is understood that any appropriate duty cycle may be used for the recovery mode and a 100% or fast ramp up is not required.

During a further loop of the process 220, the determination of mode in block 230 may be a plow mode in block 254. After determining the plow mode and following the path 250, a recalled plow duty cycle may be made in block 258. The recalled plow duty cycle may then be used to control a PWM 200 in block 262. After controlling the PWM 200 according to the plow duty cycle in block 262, a loop path 270 may be followed to the start block 224. Similar to the loop path 248, the loop path 270 may allow for continuous operation of the winch according to the process 220 with the PWM 200.

The duty cycle for the plow mode may be different than the duty cycle for the recovery mode. Similarly the different modes may have different duty cycles that may be different for any number of modes which may be saved in an appropriate memory, such as the memory 35. In various embodiments, the duty cycle for the plow mode when following the plow mode path 254 may include a lower maximum duty cycle (e.g. 50% to 75%) and have a slower ramp up. For example, the plow mode duty cycle may include a ramp up of about 5 to 10 seconds from 0% to 75%. A slower ramp up and slower maximum duty cycle may allow for slower or lower power operation of the winch 20 during selected modes, such as plow mode. During a plow mode, it may be desirable to move the plow 14 at a slower rate to reduce binding of the plow 14 and allow for ease of operation of the plow 14, including movement, of the plow 14 to different positions. Thus the duty cycle of the PWM 200 may be augmented according to the plow duty cycle to allow for ease of operation of the plow 14 with the vehicle 12.

The PWM 200, therefore, may be used to control appropriate duty cycles, according to selected instructions or processes, such as the process 220. The PWM 200 may be used to operate the winch motor 62 at multiple or different operations based upon selected modes or inputs from the user. The inputs from the user may be provided to the PWM 200 in an appropriate manner, such as those discussed above.

In various embodiments a brushless motor or a permanent magnet motor may include internal control systems that may also receive inputs from the user. The internal control systems may operate the winch motor 62 according to selected duty cycles, including those discussed above. Accordingly, the process 220 may be used to operate the winch motor 62 of any appropriate type according to a selected duty cycle to allow for alternative modes of operation, including maximum powers or modes, of the winch 20 according to selected modes of the winch 20 made by the user.

In addition to providing different duty cycles, the PWM controller 200 may allow for operation of the winch motor 62 in different manners. For example, the winch motor 62 may be operated according to selected or different modes, as discussed above, to allow for different speeds of operation of the winch 20. The winch motor may be operated in a slow, medium, and high speed, during both in and out direction, rather than simple on and off. The different modes may be provided different names, such as noted above including recovery and plow, or may be provided as alternate modes or selectable configurations by the user. Further, the user may operate the winch motor 62 directly such as with controls on the display module 29 to increase and decrease speed during use or operation of the winch motor at a selected time, rather than simply selecting a particular mode. Accordingly, during an out or in operation the user may operate the winch 20 at varying speeds based upon a direct input from the user during the in or out operation. The PWM 200 may be controlled to vary the duty cycle to the motor 62 to achieve the various speeds selected by the user. Additionally, as discussed above, the control system 10 may include various connections including Bluetooth® wireless connection protocols, WiFi® wireless connection protocols, and other appropriate wireless or wired connections to allow operation of the control system 10 outside or separate from the vehicle 12. The operation of the winch 20 may be controlled to specifically control acceleration and deceleration of the winch motor 62 and the associated spool including the cable 18 during selected modes of operation.

Figure 12:
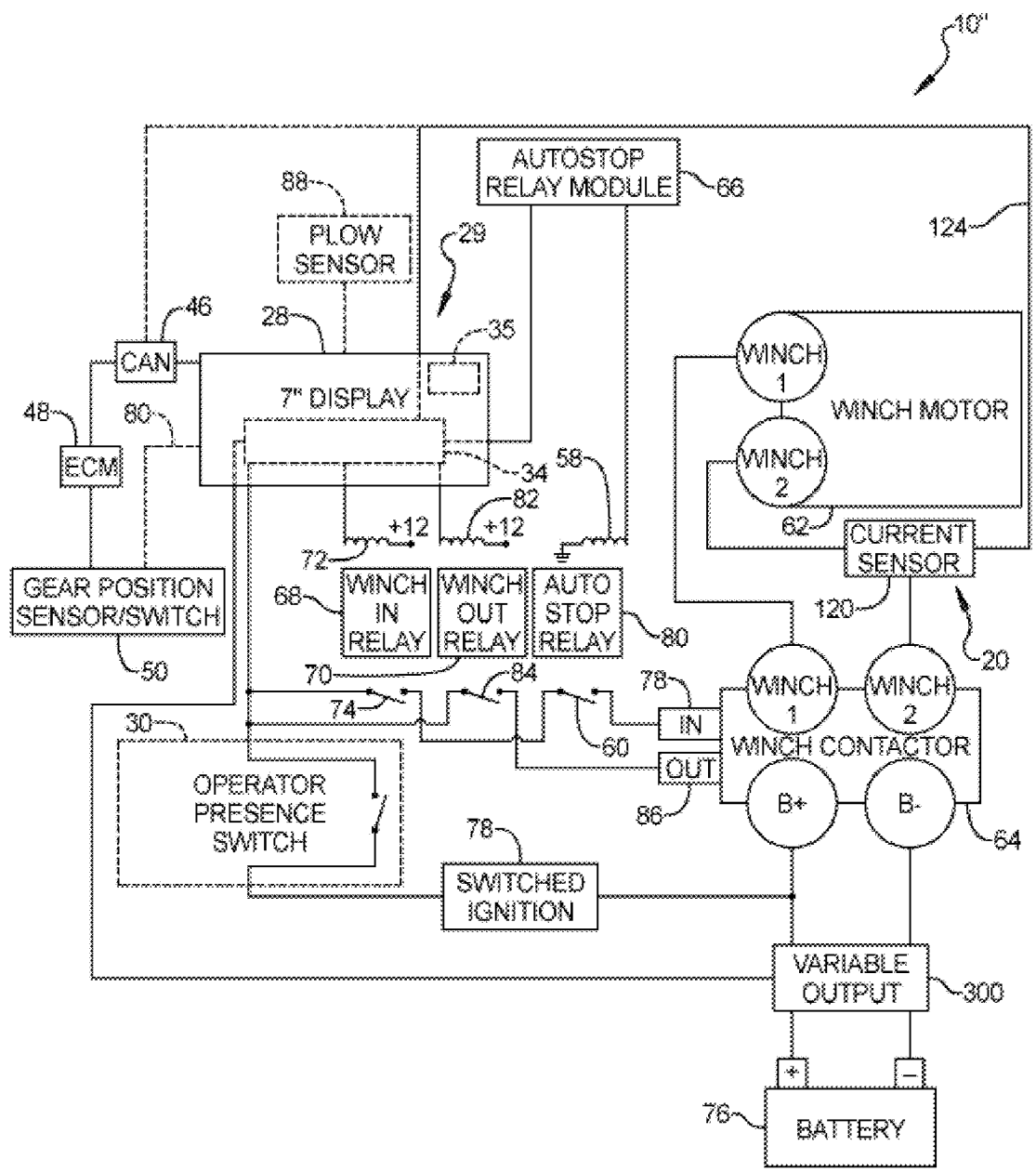
FIG. 12 is a schematic of a control system for a winch assembly, according to various embodiments.

Turning reference to FIG. 12, a control operation system 10" for the winch 20 is illustrated. The control and operation system 10" may include portions similar to those discussed above including those illustrated in the control system 10. The control system 10" may include the current sensor 120 between the winch contactor 64 and the winch motor 62. The current sensor 120 may sense a current between the winch contactor 64 and the winch motor 62, in a manner similar to that discussed above. It is understood that the current sensor 120 may be substantially similar or identical to the current sensor 120 discussed above, and therefore will not be repeated in detail here.

The current sensor 120 may send a signal on line or signal 124 that may be transmitted directly to the processor 34 and/or through the CAN bus 46. In various embodiments, therefore, a signal from the current sensor 120 may provide a signal regarding the current from the winch contactor, and the battery 76, to the winch motor 62. As discussed above, the current sensed by the current sensor 120 and transmitted in the signal along line 124 may relate to a draw of power of winch motor 62.

The processor 34 may execute instruction and control logic for the operation and control system 10". Accordingly the processor 34 may execute instructions that are stored in a selected memory, such as the memory 35. The instructions may be used to control or operate a variable output 300 based upon selected inputs, such as selections or mode operations, of the user. The control logic may include or receive inputs from the current sensor 120 and/or other sensors for operation of a variable output 300.

The variable output 300 may allow for the output from the battery 76 to the winch motor 62, such as through the winch contactor 64, to be varied based upon a selected control logic from the processor 34, or any appropriate control logic system or mechanism. The variable output 300, for example, may be a DC-to-DC converter, particularly in an operation or system where the winch motor 62 has a direct current (DC) motor. The variable output 300, therefore, may operate the winch motor 62 at a selected output based upon the control scheme such as generated or determined by the processor 34 based upon selected instructions. Selected instructions may be saved and recalled from the memory 35 and executed by the processor 34. It is understood that the processor 34 may provide control or operation of the variable output 300 according to selected instructions, as discussed further herein. One skilled in the art will also understand that the control logic or instruction may be included in the variable output controller 300 and/or in the control system 10".

Regardless, the instructions may be used to operate the winch motor 62 at a selected manner, such as allowing for force limiting on the cable 18 and/or from the motor 62, for various purposes. For example, a selected winch motor may be used to provide various maximum forces. The forces may be selected or varied (e.g. a selected maximum) with the variable output 300. In various embodiments, the control system 10" may be programmed to allow for a maximum output through the variable output 300 to select a power rating for the winch 20 and operation of the motor 62. Selection of a power rating for the winch 20 to be less than a maximum possible power that a specific winch motor may be able to produce. The reduction of a maximum applied power may allow for the use of a single winch motor in different applications, such as cable types, uses, or the like. Thus, gearing or motors need not be changed to provide a different power rating or force rating for the different winches. For example a cable, such as a steel cable of a selected size, strength, or the like.

A steel cable may have a greater tensile strength than a polymer cable or rope. Accordingly, the control logic or instructions may be programmed to allow an output that provides a maximum motor power selected for a given or known type of cable on the winch 20. The variable output 300, for example, may control or limit the maximum ratio of motor voltage to battery voltage, maximum motor voltage, maximum motor current, or the like.

Accordingly, the control system 10" may be programmed to operate the winch motor 62 according to preset limits to provide the winch 20 for selected purposes and based upon selected configurations. Further, this may allow a single motor or winch configuration to operate within various limitations for different materials without changing hardware configurations of the winch system 20. A single motor and/or gearing winch package may be provided with different maximum power ratings that are selected or controlled with e variable power output 300.

It is further understood that the control logic may be changed or augmented at any selected time, if selected or allowed. Accordingly, the winch may include various settings to be selected by the user, such as with the display module 29, depending upon selected operations of the winch 20. For example, the user may select steel cable and the winch motor 62 may be operated at a selected output from the variable output 300. Alternatively (e.g. at a later or different time, such as changing the cable 18 to a different type), the user may select rope with the display module 29 and the variable output 300 may be operated according to a second set of parameters to allow the winch motor 62 to operate at a second set of parameters. The winch motor 62 may be operated according to variable output from the variable output 300 based upon selected parameters that may be programmed at an assembly of the winch control system and/or winch motor system 20.

One skilled in the art will understand that the variable output may be operated based upon a set of software controls that are incorporated into the variable output 300. The variable output 300 may be changed or selected based upon inputs from various user input systems, such as the display module 29, an auxiliary switch, as discussed above, or other appropriate inputs. Accordingly, the variable output may vary the output from the battery 76 to the motor 62 based upon internal logic or instructions rather than those stored in a separate system, such as the memory 35. Regardless, the variable output 300 may be operated to control output to the winch motor 62 based upon selected instructions or parameters, as discussed above.

Various sensors may be incorporated into the control system 10 and/or the winch 20, including the winch control for the motor 62. Additionally and/or alternatively, various sensors may be incorporated into the winch 20, including within the winch motor 62 and/or the winch spool for various purposes. For example, an encoder may be included, such as a rotary encoder, for determining speed and/or position of the winch motor and/or spool of the winch.

Figure 13:
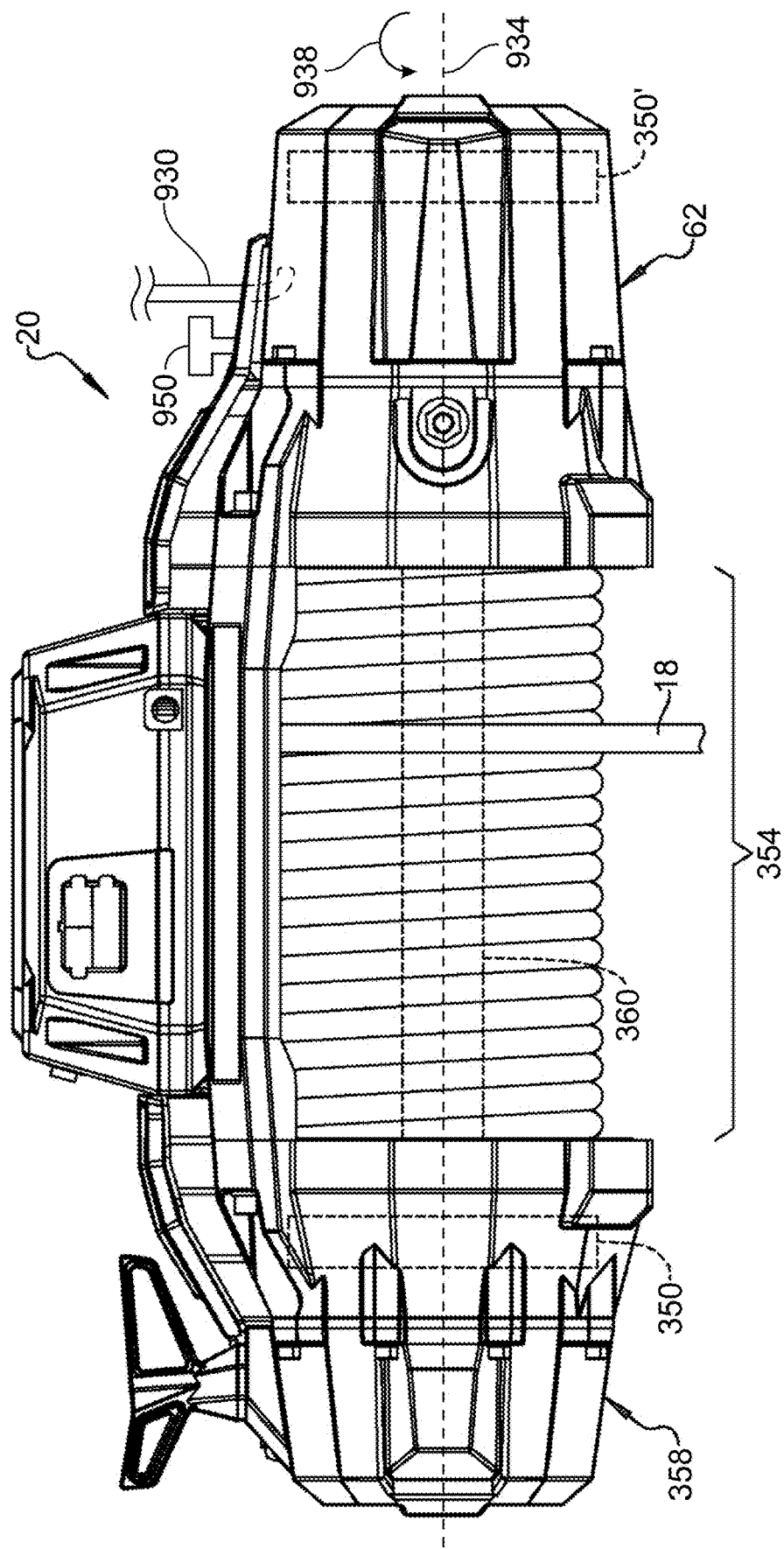
FIG. 13 is an elevation view of a winch assembly, according to various embodiments.

In various embodiments, an encoder 350 may be incorporated into various portions of the winch 20, as illustrated in FIG. 13. For example, the encoder 350 may be incorporated into or at the winch motor 62. As illustrated in FIG. 13 the winch 20 may include the winch motor 62 that includes a spindle area 354 on which the cable 18 is spun or wound. Additionally a gear box 358 may interconnect with a spindle 360 that extends between the winch motor 62 and the gear box 358 in the spindle or drum area 354. A second or alternative encoder 350' may be provided in the gear box 358 and/or to interconnect with the spindle directly 360. Accordingly, an appropriate rotor encoder may be provided in the winch assembly 20. The rotor encoders 350, 350' may be any appropriate type of rotor encoder such as a magnetic encoder, optical encoder, or other appropriate encoder. Exemplary encoders include an AR62 rotary encoder sold by Dynapar, having a place of business in Gurnee, Illinois.

Figure 14:
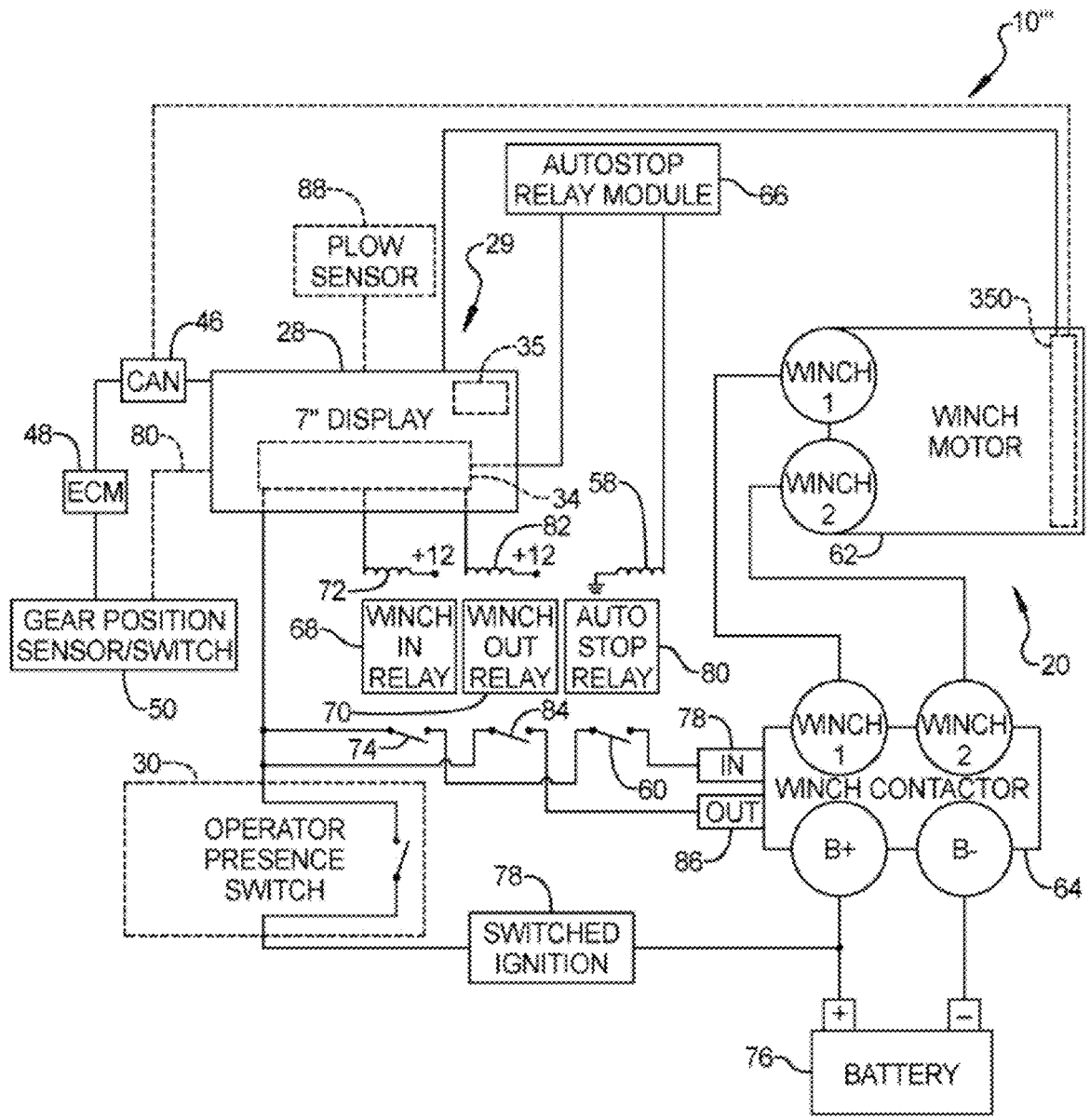
FIG. 14 is a schematic of a control system for a winch assembly, according to various embodiments.

The rotary encoder, exemplary discussed herein as the encoder 350, may be incorporated into the winch assembly 20 to provide a signal regarding various aspects of the motion of the winch motor 62 to the control system 10''' as illustrated in FIG. 14. The control system 10''' may include a connection between the processor 34, such as included in the display module 29, and the rotary encoder 350, directly and/or through the CAN bus 46. Accordingly, a signal from the rotary encoder 350 may be provided to the display module 29 to allow for operation of the winch 20 according to a selected control or control logic, as discussed further herein.

The rotary encoder 350 may be provided to determine a speed of the winch motor 62 directly and/or the spindle 360 directly and/or inferentially. The rotary encoder 350 may, therefore, transmit a signal to be used to operate the winch motor 62 at selected and various speeds according to the systems as discussed above. The winch encoder 350 may be incorporated into a control system that includes the additional or other control features or sensors such as current sensor 120, the PWM 200, or the variable control 300. The winch motor 62, therefore, may be controlled, at least in part, based upon a signal from the rotary encoder 350. Thus, the control system 10''', either alone or in combination with the other systems or portions of the other control systems 10, may be used to assist in operating and controlling the winch 20.

The rotary encoder 350 may transmit the encoder signal to the logic system or processor 34 for various purposes. For example, the encoder 350 may be used to count a number of turns of the spindle 360 to estimate an amount of rope that is let out or retrieved. The encoder 350 and/or the processor 34 may use the encoder signal to determine whether the cable 18 is near an end point, such as a "maximum out" or "maximum in".

Further, the encoder 350 may be used to determine a speed of the motor 62 to assist in operation of the motor 62 and to control the motor 62 based upon various inputs. As discussed above, different cable materials for the cable 18 may be specified to have different speeds or power of the motor 62 or proper operation of the cable 18. Thus, the encoder 350 may be used for assisting and operating the motor 62 of the winch assembly 20.

Figure 15:
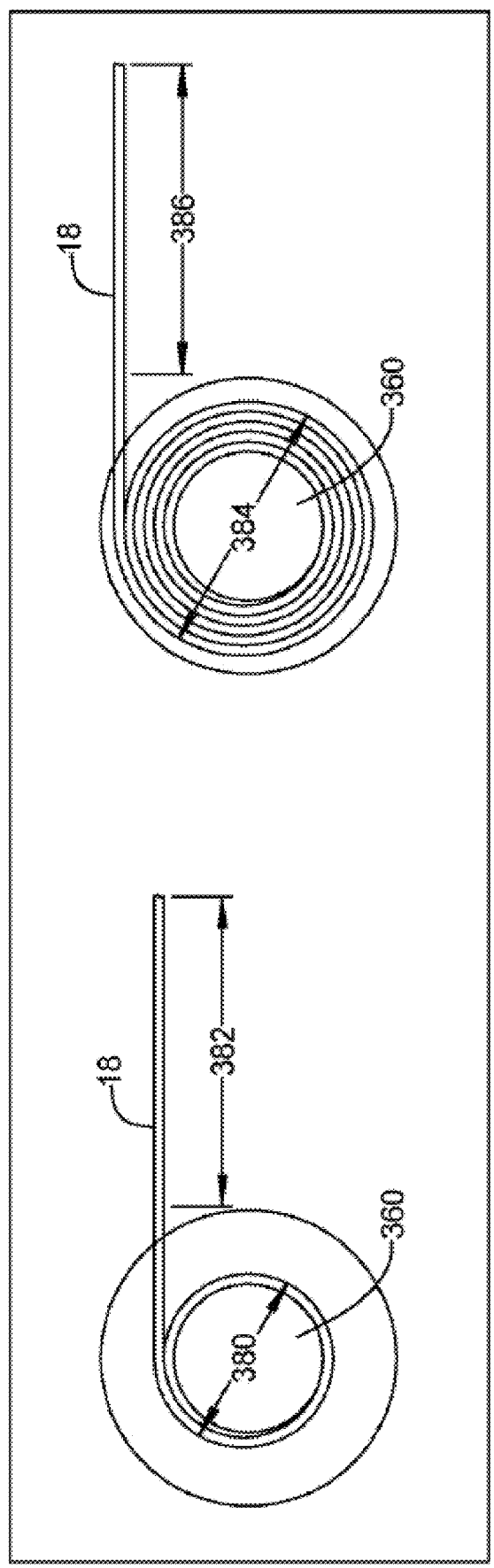
FIG. 15 is an illustration of two winch spindles with variable amounts of cable thereon, according to various embodiments.

In various embodiments, with continuing reference to FIG. 13 and additional reference to FIG. 15, the spindle 360 may include a selected amount of the cable 18 wrapped thereon. As illustrated, the spindle 360 including a selected amount of the cable 18 may have a first diameter 380. The encoder 350 may be able to count a number of turns to allow for a determination of an estimated diameter and, therefore an amount of travel of the rope along a selected length 382 based upon the diameter 380 which may be known or estimated depending upon or based upon a number of turns of the spindle 360 and the cable 18. In other words, the encoder 350 may be able to determine a speed or amount of travel of the cable 18.

The determination of a length of the cable 18 left out or wound on the spindle 360 may be useful in selected modes, such as in determining an amount of travel of the plow 14 during movement of the plow up or down. The control or operation system 10''' may be used to determine the position of the plow 14 relative to the surface 17 and/or a full up position. Again this may be used to eliminate or stop binding of the winch 20 when the plow 14 is in a full up position. The winch motor 62 may be slowed down when an amount of the cable 18 is determined to be entirely or nearly entirely in such that the motor 62 does not overload or excessive force is applied to the cable 18 and/or the gear assembly 358. Accordingly, the winch control system 10''' may be used to determine a time to slow down the movement of the winch 20 to allow for greater control and time to stop the plow 14 by stopping movement of the winch motor 62 when the plow is near the full up position.

As understood by one skilled in the art when a greater amount of the cable 18 is wound on the spindle 360 a large or different diameter 384 may be to an exterior of the portion on which the cable 18 is wound. Thus, one rotation of the spindle 360 may cause a greater length, at least a different length 386 of the cable 18 to move relative to the spindle 360 during operation or rotation of the spindle 360 by the motor 62. Accordingly, the encoder may be used to count the number of rotation and the control system 10''' may be used to estimate the diameter 380, 384, or any appropriate diameter, to estimate or determine a position of the end of the cable 18 relative to the winch assembly 20 for various purposes. In various embodiments, the amount of cable on the spindle 360 may be used for determining an up or down position of the plow 14 and/or to cease or initiate operation of the motor 62 and/or control or change the speed of the motor 62. Further, the memory 35 (or other appropriate memory) may be used to save a last count number. Thus, the control system 10''' may always "know" or recall an estimated amount of cable on the spindle 360, and, therefore, a diameter from which the cable is being let out or withdrawn on.

As further discussed above, the encoder 350 may be used in combination with other sensors, such as the current sensor 120. The current sensor 120 may be used to determine end travel points, such as a fully in position of the cable 18 and a fully down position of the plow 14. As discussed above, a high current may be related to the full in, particularly in the plow mode, and a low current may relate to a full down position of the plow 14. The encoder 350 may be used to count or estimate the distance between the full in and full out positions of the cable 18, which may relate to fully up and fully down positions of the plow 14. Thus, for example, in the plow mode 14 the encoder 350 may be used by the control assembly 10''' to indicate to the user and/or determine speed of operation of the winch 20 between the two endpoints. For example, the control system 10''' may be used to operate the winch motor 62 at a faster rate of speed a selected distance, such as greater than 30%, from one of the two end points. Thus, the plow 14 may move faster between a fully up and a fully down position while slowing when nearing either of the fully up or fully down position. Again this may allow for easier control of the plow 14.

Further, in various modes, such as recovery mode, the encoder 350 may be used to determine a speed of the winch motor 62, the spindle 360, or the gear assembly 358 to determine an amount of force on the motor 62. When the spindle 360 is moving quickly, the control system 10''' may operate the motor 62 at a higher speed to allow for a fast uptake of the cable 18 during a recovery or initiating a recovery. Once the spindle speed slows the encoder 350 may determine that a greater force is applied to the cable 18, due to a slowing of the spindle 360, and the control system 10''' may be used to operate the motor 62 at a slower speed for a controlled recovery of the vehicle 12.

The encoder 350, particularly when monitoring a number of rotations or estimated length of movement of the cable 18, may also be used to perform certain operations, such as a self or automated loading, recovery, or the like. For example, a user may connect an end of the cable to a point in a trailer by pulling out or letting out the cable 18. The encoder 350 may measure the amount of cable let out (e.g. number of rotations of the spindle 360). The user may then select the winch 20 into self-loading mode and the encoder 350 may count the number of in turns of the spindle 360 to draw the vehicle 12 into a trailer. The winch system 20 may then be operated with the control system 10''' to wind in the winch 20 a selected number of turns, such as those counted by the encoder 350 during the let out. Also, additional sensors may be provided to determine when the maximum load is reached (e.g. the current sensor 120) at a determined time when the vehicle 12 is within a trailer. Accordingly, the encoder 350 may be used to determine an amount or movement of the cable 18 for various purposes, such as a self-recovery or self-loading for trailering.

Figure 16:
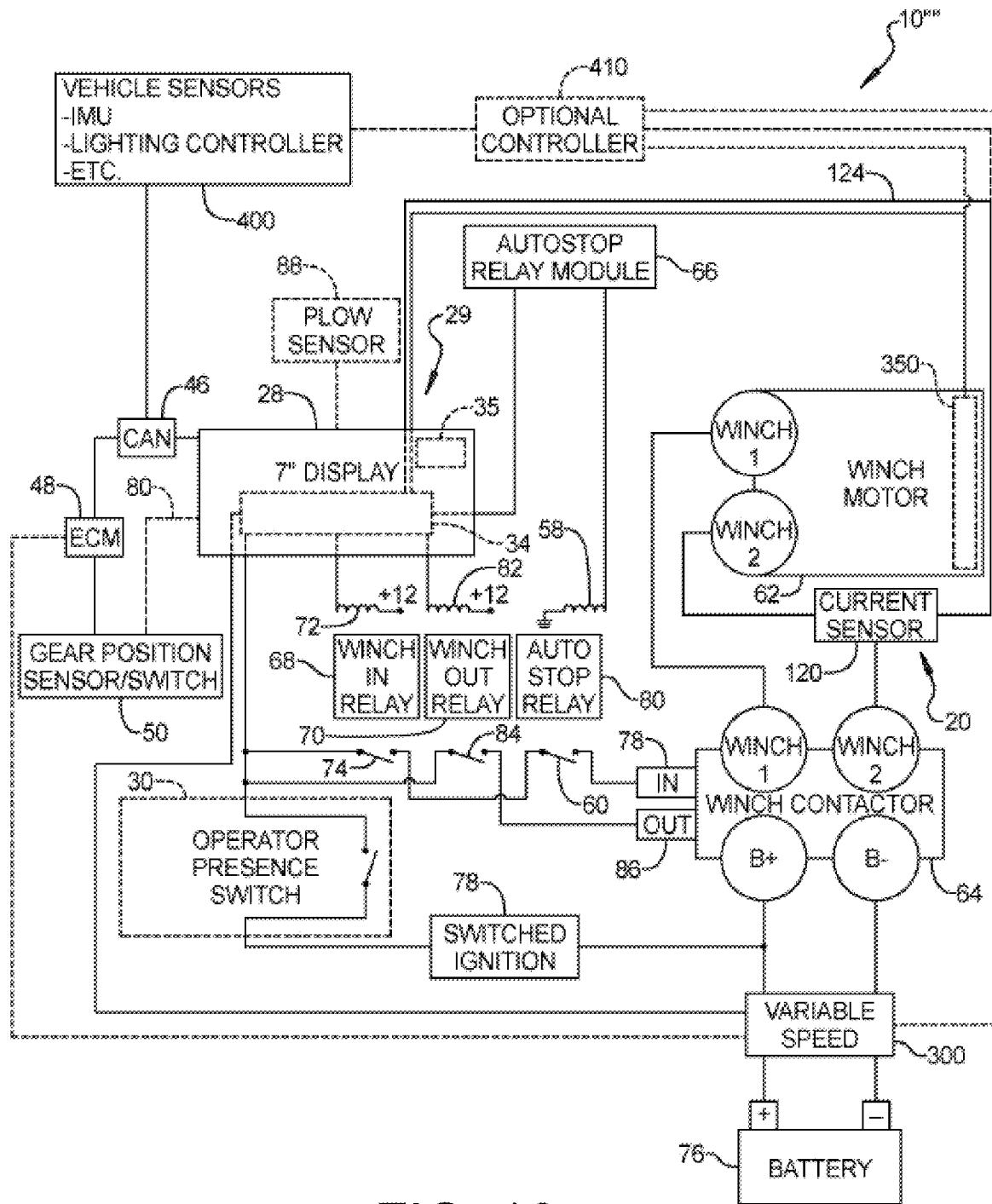
FIG. 16 is a schematic of a control system for a winch assembly, according to various embodiments.

Turning reference to FIG. 16, the display module 29 including the display 28, may display various features or modes or states of the winch 20 due to communication between the winch assembly 20 and the display module 29. As discussed above, the winch control system may include various portions and all of the controls and sensors may be incorporated into a single control system 10'''. The control system 10'''' may include the encoder 350, the current sensor 120, the variable speed controller 300 (which may include a pulse width modulation (PWM) system), or any other appropriate sensors or controllers. The sensors may be connected to the display module 29. Further the display module may receive additional sensor input from other vehicle sensors 400 such as lighting controllers, engine controllers (e.g. ECM 48), inertial measurement units (IMU), or other sensors on the vehicle 12. For example, an IMU may be included in the vehicle 12 to sense or measure an angle or position of the vehicle 12 in space and/or relative to the surface 17. As illustrated in FIG. 16 the vehicle sensors 400 may communicate via the CAN bus 46 with the display module 29.

The display module 29 may include the processor 34 that may connect or transmit a signal to the variable speed controller 300 directly to control a speed of the winch motor 62. Additionally, as illustrated in FIG. 16, the display module 26 may also communicate through the CAN bus 46 to the ECM 48 to transmit a signal to the variable speed controller 300. In various embodiments, the various sensors and systems may also connect or transmit signals to an optional controller, either through the CAN bus 46 and/or other communication systems and the optional controller 410 may transmit a signal to the variable speed controller 300. Accordingly the variable speed controller 300 may be controlled through signals transmitted from various systems to operate the winch motor 62 at an appropriate or selected manner (e.g. speed or power). Regardless, the display module 29 may also receive a signal from the optional controller 410, the vehicle sensors 400 (including any various sensors of the vehicle sensors) and/or relative to the winch motor system 20, including the current sensor 120, the encoder 350, and other sensors. Thus, the display 28 of the display module 29 may display information, including mode, speeds, and the like, for the user of the vehicle 12.

Also, as discussed above, the winch motor 62 may include an internal controller or sensor system. For example, in a brushless motor system or a permanent magnet system, the winch motor 62 may include an internal speed controller sensor, current sensor, or the like. The information from the winch controller of the winch motor 62, which may be incorporated therein, may also be transmitted to the display module 29. Regardless, the display module 29 including the display 28 may display information for the user regarding the winch assembly 20.

For example, the user may operate or activate the winch system 10'''' and on the display 28 may be displayed a speed of the winch 20, a pull force on the cable 18, a length of the cable extended, and other appropriate information. Also, as the display 28, incorporated into the display module 29, may be in communication with the CAN bus 46 and the vehicle sensors 400, or directly to the vehicle sensors 400, thus the display 28 may also display various information regarding the vehicle including a vehicle inclination or angle, battery voltage, vehicle engine speed, or other appropriate information.

The winch control system 10'''' may incorporate or "learn" various modes of operation. For example, during a "plow mode" the control system 10'''' may operate the winch assembly to determine end points of the plow 14, such as by receiving signals from the current sensor 120. The current sensor 120 may be used to determine a fully in or up position and a fully out or down position of the plow 14, as discussed above. The encoder 350 may be used to determine the number of turns between the two positions. The information may be saved in the control module 29, such as the memory 35 thereof. During selection of plow mode with the display module 29, such as by the user, the display module 29 may then recall the end point positions, as determined with the encoder 350, and operate the winch motor 62 at different speeds depending upon the position of the plow or cable let out relative to the end points. The operation of the winch motor 62 in the plow mode may be similar to that discussed above, but may be determined and displayed on the display device 28. Further the determination of the end points and the encoder 350 may allow for an automatic positioning of the plow 14 at an up or down position as selected by the user.

Figure 17:
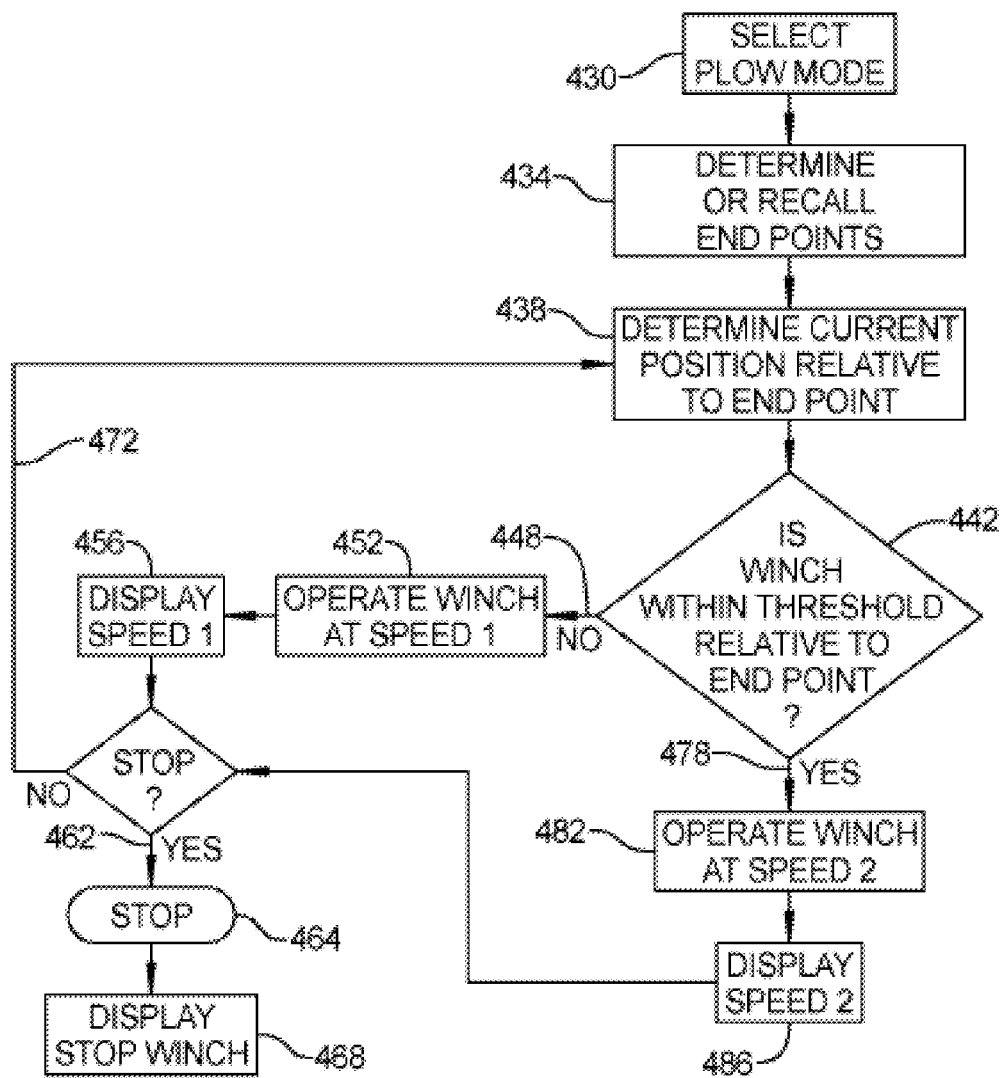
FIG. 17 is a process for operation of a winch system, according to various embodiments.

In various embodiments, as discussed above, and as illustrated in FIG. 17, a plow mode may be selected. If the user selects a plow mode, such as with the display device module 29, a plow mode selection in block 430 may be made. A determination or recalling of endpoints may then be made in block 434. As discussed above determination of endpoints may be made with signals received from the current sensor 120 during a selected operation of the winch system 20. For example, the winch system 20 may be operated as a teaching mode with the plow 14 to allow the winch control system 10"" to determine or learn the endpoints. The endpoints may then be saved in the memory 35 for recall when the plow mode is selected again, such as after the learning or determining selection time. Also, the endpoints may be predetermined (e.g. at assembly of the vehicle 12 with the winch 20). Thus, the endpoints may be determined or recalled in block 434.

The determination of whether the current position is relative to an endpoint may then be made in block 438. The encoder 350 may be used to determine whether the cable 18 is near a determined endpoint. As discussed above the encoder 350 may be used to determine the position of the winch motor 62 and/or the spindle 360 relative to the determined or recalled endpoints. The determination of the current position of the cable 18 relative to the endpoints may then be made based upon signals received from the encoder 350 regarding a previous or total speed of the motor 62, rotations of the spindle 360, or other appropriate determination.

The determined current position may then be used to determine whether the winch is within a threshold relative to the endpoints in block 442. The threshold may be any appropriate distance, such as a selected discrete distance (e.g. two to three turns of the spindle or two meters of the cable 18) or a relative position (e.g. 20% between the determined endpoints).

Regardless of the threshold, which may be predetermined and programmed into the control system 10"f, a determination block 442 may follow a NO-path 448 if the threshold is not met. In following a NO-path the winch motor 62 may be operated at a speed 1 in block 452. Speed 1 may be a "fast" speed that may allow for a quick movement of the cable 18 to reach the endpoints. The speed 1 may then be displayed in block 456 on the display 28.

A determination may then be made as to whether stop in block 458. If a determination is made to stop, such as by selection by the user and/or whether a signal to stop has been met a YES-path 462 may be followed to a stop block 464 which may cease operation of the winch 20. Ceasing operation of the winch 20 in block 464 may include displaying stop winch in block 468, such as with the display 28. The user may then operate the winch as selected by the user, such as reinitiating the winch, moving the vehicle 12, or other appropriate actions.

If a stop winch has not been made in block 458, a NO-path 472 may be followed to the determined current position in block 438. Again a determination of whether the winch is within the threshold in block 442 may be made and the NO-path 448 may be followed or a YES-path 478 may be followed. If the YES-path 478 is followed, an operation of the winch at speed 2 may be made in block 482. The operation of the winch at speed 2 may be less or slower than the speed 1. Speed 2 may be less than speed 1 to allow for more control and/or easier stopping of the plow 14, such as when the plow 14 is near the endpoints, at the endpoints to eliminate or limit movement of the cable 18 past the endpoints. The speed 2 may be displayed on the display 28 in block 486.

The process then may go to the stop determination block 458 and a determination of whether a stop is selected may be made and the NO-path 472 may be followed or the YES-path 462 may be followed. Accordingly, the plow mode may be selected to operate the winch system 20 in a selected manner to move the plow 14 in a selected manner to minimize various fault conditions such as binding and/or failure of the cable 18, or other conditions.

The communication relative to the winch system 20 and the control system 10"" may also be used in a vehicle retrieval or recovery mode. In a vehicle recovery mode the winch motor 62 may be operated at a selected speed, such as a single high speed, until a selected force is sensed at the winch motor 62 or the spindle 360. In various embodiments, as discussed above, the speed of the motor 62 may be determined with the encoder 350 and/or a current to the motor may be determined with the current sensor 120. The determination of the current sensor may be relate or correspond to a force at the winch 20 and the speed of the motor 350 may also relate to a force at the winch 20. Accordingly, the winch motor 62 may be operated at a single high speed or selected single speed until a selected force is reached based upon the optional controller 410 and/or the display module 29. The force may be predetermined, such as during a manufacture of the winch 20, or at any appropriate time. Further the force may be continually monitored such that the slow down at a time when a selected force is determined and speed up when the force is reduced (e.g. when the vehicle moves over a small obstruction but is not entirely recovered).

The control module 10"" may also include a trailering mode wherein the winch 20 may be placed in a locked configuration (e.g. locking the spindle 360). While locked, the cable 18 may then be attached to a selected portion of the trailer. The winch 20, when in the trailering mode per the winch control system 10"" may then transmit a signal to the display 28 and/or remotely (e.g. via Bluetooth® wireless connections, WiFi® wireless connections, cellular wireless connections) to a user to determine when movement of the winch motor 62 is determined while in a trailing mode. If movement of the winch motor is detected when in the trailering mode and the winch drum or spindle is locked, a signal may be sent to alert the user that the vehicle 12 may be loose. In the trailering mode movement of the winch motor may relate to movement of the vehicle 12 from a selected position.

Also, as discussed above, the vehicle sensors 400 of the vehicle 12 may provide inputs to the winch control system 10"". Accordingly the winch motor 62 may be operated based upon inputs from various vehicle sensors. The vehicle sensors 400 may include the IMU. If the IMU senses that the vehicle is moving in a selected direction (e.g. tilting) at a selected speed and/or past a selected threshold, the winch motor 62 may be operated to stop movement of the vehicle 12 by stopping the winch motor 62. Thus, the vehicle 12 may be maintained in a substantially upright or stable position by automatic operation of the winch 20 when a selected titling of the vehicle 12 is determined.

Finally as discussed above, the user may select the automatic trailering or loading configuration and un-spooling the cable 18 a selected distance which may be determined or measured by the encoder 350. The winch operation system 10"" may then be operated to automatically load the vehicle 12 or move in a selected distance based upon the measurement of the movement to the cable 18. Thus, the vehicle 12 may be positioned near a trailer and the cable 18 may be connected to a portion of the trailer by un-spooling it from the winch 20 a distance that may be measured by the encoder 350. The winch 20 may then be operated to wind in the cable 18 the measured distance to automatically load the vehicle 12 onto the trailer.

As discussed above, and illustrated in the various figures, the control system 10"" may operate the winch assembly 20 in a selected manner based upon various variable inputs to the winch motor 62 and/or signals from sensors relative to the winch motor 62. Accordingly, based upon various feedback or sensed signals from the sensors, the winch 20 may be operated based upon selections of modes by the user and feedback from the various sensors. However, in various embodiments, the winch 20 may be operated without specific external winch sensors. As discussed further herein, the winch 20, including the winch motor 62, may be operated with vehicle sensors separate from winch specific sensors as discussed above.

As discussed above, the winch 20 may include various sensors or controls, such as illustrated in FIG. 16 in the winch control system 10"". In various embodiments, however, the winch system 20 may include a control system 10"" that does not include separate or external sensors directly for operation of the winch 20. The winch control assembly 10"", however, may receive or be controlled by the processor 34 in the display module 29. The control system 10"" may include or be connected to the vehicle bus or CAN bus 46, as discussed above. Further, the CAN bus 46 may be interconnected with one or more vehicle sensors 400. Accordingly, input from the vehicle sensors 400, separate from on or incorporated into the winch assembly 20, may be provided to the processor 34, or other appropriate controller of the winch motor 62.

Figure 18:
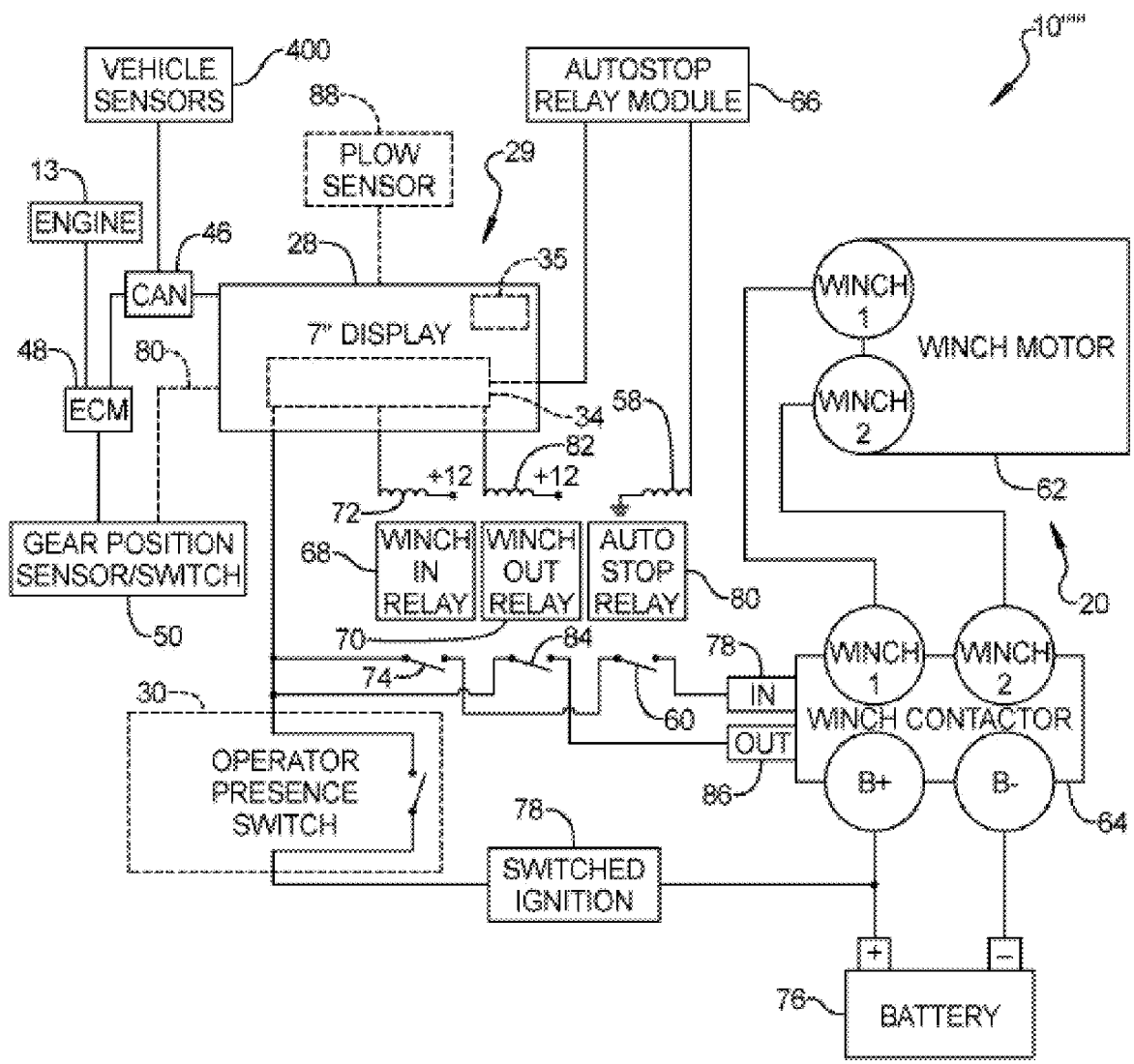
FIG. 18 is a schematic of a control system for a winch assembly, according to various embodiments.

The vehicle sensors 400 may include sensors and/or controllers for various systems. Exemplary, and not intended to be limiting, vehicle sensors 400 may include:
1. Box (e.g. cargo area) lift Controller
2. Lighting Controller
3. Chassis/suspension Controller
4. Brake Controller
5. Steering Controller
6. Engine Controller
7. Transmission Controller
8. Displays and/or instrumentation
9. Radio controllers
10. Auxiliary lighting The various sensors and/or vehicle systems 400 may transmit inputs or states with the vehicle CAN bus 46. For example, the lighting controller may transmit a state of any lights in the vehicle, such as forward headlights, that may be operating or not operating. The state or condition of the lights via the lighting controller of the vehicle sensors 400 may be transmitted over the CAN bus 46 to the winch control processor 34. The state of the vehicle may be displayed on the display 28 and the winch motor 62 may be operated or have its operation augmented based upon sensor inputs. For example, the winch motor 62 may be operated to ensure proper stable operation of the vehicle 12 during operation of the winch motor 62 and following operation of the winch motor 62. As illustrated in FIG. 18 the winch motor 62 is operated with the battery 76. The battery 76 may also be used to operate other electrical systems on the vehicle 12, such as the lighting systems. Accordingly the winch motor 62 and/or systems on the vehicle 12 may be augmented during operation of the winch motor 62 to ensure proper operation of the winch motor 62 and continued operation of the vehicle 12 during and after operation of the winch motor 62.

Various selected or desired operations of systems of the vehicle may be done and/or operation of the winch motor 62 may be performed to ensure proper operation of the vehicle. For example, systems of the vehicle 12 may be augmented. Exemplary, and not intended to be limiting, augmentations or considerations may include:

1. Change operation of the winch motor 62 (e.g. slower) to maintain stable engine idle with adequate RPM to recharge after a recovery operation.
2. Control of winch line free spooling out line to connecting line hook to recovery object.
3. Automatic short reversal of winch drum/spindle 360 to relieve line tension to disconnect line and hook.
4. Low battery/system voltage lock out (e.g. stop operation of the winch 20 and/or not allow starting of the winch) to protect re-start or stalling of engine depending if engine is running during which operation or not. The system voltage required to start engine vs load required to stall the engine can be different.
5. Vehicle equipped with drive assist, sensors, video cameras, indicators, displays providing operation and vehicle communication network alerting or dis-allowing dangerous operations, work techniques, blind spot detection to stop or slow winch operation when impending collisions are sensed.
6. Automatic electrical load shedding or reduced performance of non-critical electrical accessories during intermittent peak load operations of the winch to maintain system voltage. Thus, the operator does not need to turn off an electrical accessory to keep the engine running. Example: Operator cannot raise plow because lights, heater blower, radiator fan, wiper/washer, radio, box lift, EPS, brakes engine at idle.

The various systems discussed above, may include additional systems or not all of the systems may be used to augment operation of the winch 62 and/or systems of the vehicle 12. Nevertheless, the system 10"" is understood to allow for varying operation of the vehicle systems separate from the winch motor 62 and/or operation of the winch motor separate from the vehicle systems and sensors 400 to allow for optimal or selected operation of both. For example, the controller 34 may include selected instructions to ensure proper charge of the battery 76 during operation of the winch motor 62 to ensure that the engine of the vehicle 12 may be operated, such as started and/or maintained at idle, during operation of the winch 62. Accordingly the vehicle sensors 400 may provide information through the CAN bus 46 to the controller 34. The controller 34 may, automatically due to execution of instructions such as those stored in the memory 35, determine that the lights of the vehicle are on and if the user is attempting to operate other electrical systems while the winch motor 62 is being powered. The controller 34 may send a signal via the CAN bus 46 to dim lights, turn off the radio, or other non-essential electrical systems, to reduce load on the battery 76. Further, the controller 34 may send a signal via the CAN bus 46 to the ECM 48 to operate the engine 13 at a selected RPM to ensure maintaining power recharge to the battery 76 at a selected rate to ensure proper operation of the winch motor 62 and other selected and/or essential systems of the vehicle 12.

As a further example, in various embodiments, the vehicle sensors 400 may include collision sensors and/or cameras. Accordingly the sensors 400, such as a collision avoidance sensor, may send a signal via the CAN bus 46 to the processor system 34. The collision sensors may sense proximity of an external item, such as a tree, and the controller 34 may determine a speed of operation of the winch motor 62 and/or stopping of the winch motor 62 when the collision sensor determines proximity of a selected item. In various embodiments, for example, a user may connect the cable 18 to a tree. The user may then operate the winch 20 to recover the vehicle 12 from a selected situation. As the vehicle 12 nears the tree the collision sensors of the vehicle sensors 400 may determine proximity of the tree, and/or other obstructions. The controller 34 may receive signals via the CAN bus 46 and automatically control operation of the winch 20 based upon the inputs. Thus, the winch 20 may be operated by the processor 34 executing selected instructions, as discussed above, based upon inputs from the vehicle sensors 400. The operation of the winch motor 62, therefore, may be operated based upon input from sensors separate from specific winch feedback sensors but include inputs transmitted to the processor 34 via the CAN bus system 46.

Accordingly, in various embodiments including those discussed above, the winch motor 62 of the winch 20 may be operated in various, including variable manners. The user of the vehicle 12 and the winch 20 may operate the winch 20 in a selection or selected manner, such as by selecting recovery mode, plow mode, or by turning on or off the winch 20. Nevertheless, the winch 20 may be controlled by selected systems, including those discussed above, to automatically control or augment operation of the winch 20, such as speed or power of the motor, based upon selected inputs. The inputs may be based upon mode selection by the user, input or information from inputs from winch sensors or controllers, or inputs from sensors or controllers external to the winch (e.g. the vehicle sensors 400 transmitting inputs over the CAN bus 46). The winch controller, such as the processor 34, may receive inputs from various systems or sensors to augment or change operation of the winch motor 62 based upon selected inputs in executing selected instructions, such as those discussed above.

The winch system 20 may be used for various purposes, as discussed above, including recovery of the vehicle 12. The vehicle 12, as noted above, may further include various additional features such as headlight systems or headlight 500. In addition, the vehicle 12 may include additional or auxiliary lights, such as auxiliary or upper lights or light bar 510. The auxiliary lights 510 may articulate or move relative to the vehicle 12 including a cockpit rail 514 thereof. The cockpit or canopy rail 514 may allow for mounting of the auxiliary light 510 to the vehicle 12. The auxiliary lights 510 may be operated with a switch that may also communicate with the CAN bus 46, as discussed above.

The winch system 20 includes the cable 18 that may pass through the fair lead 22. In various situations, the cable 18 may be connected to an anchor point 520 to assist in removing the vehicle 12 from a position, such as within a mud filled hole or behind an obstruction (e.g. log) 524. The vehicle 12 may be connected to the anchor 520 in a recovery mode and the recovery mode for the winch assembly 20 may be selected by the user, such as with the display assembly 29. The vehicle headlights 500 may be at a position to not adequately or selectively illuminate the anchor point 520. The auxiliary lights 510 may be positioned in a spot able to illuminate the anchor point 520. The fair lead 22 may include sensors to assist in determining a position of the cable 18 relative to the winch assembly 20.

Figure 19:
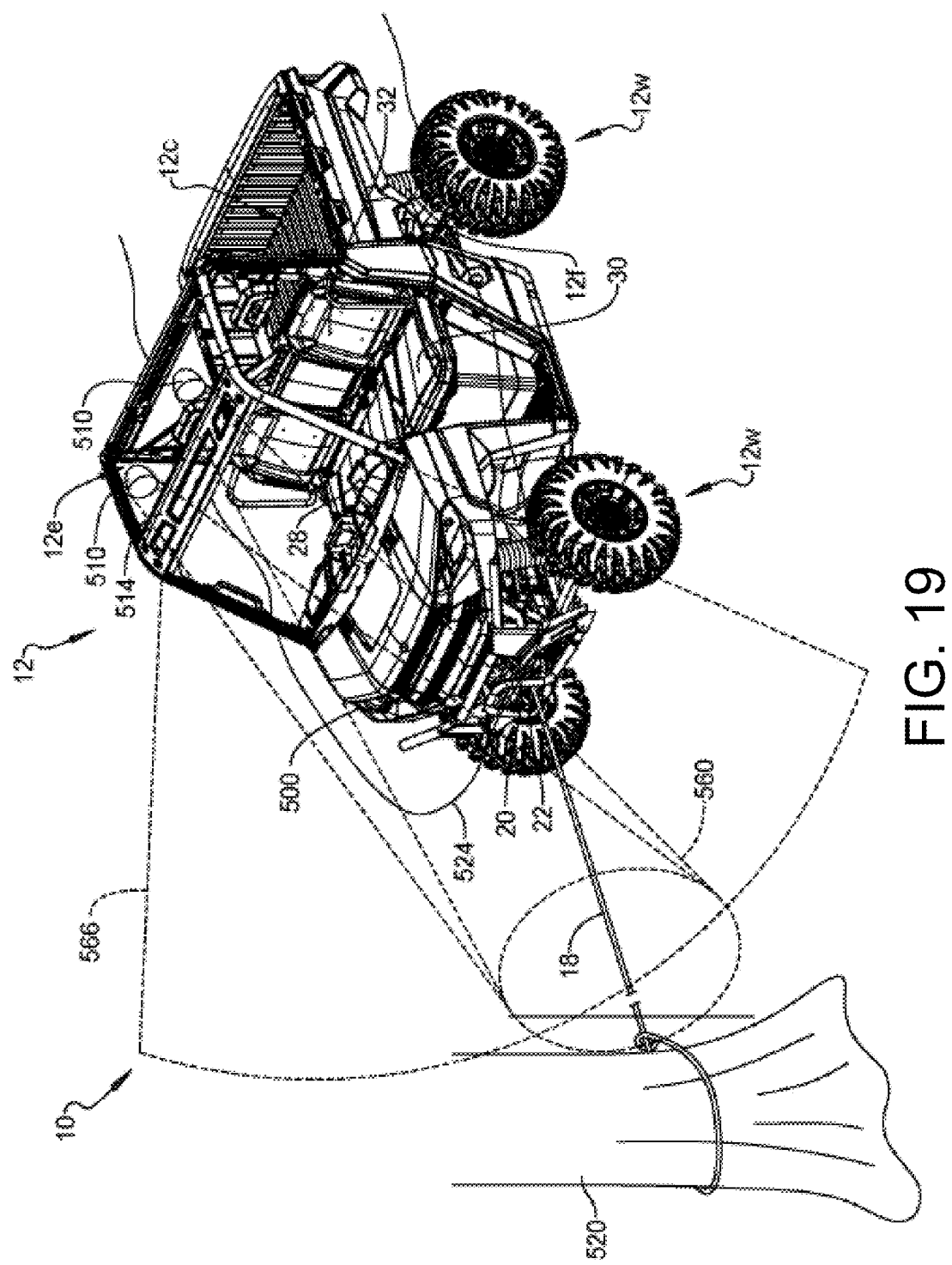
FIG. 19 is an environmental view of a vehicle and a winch assembly.
Figure 20:
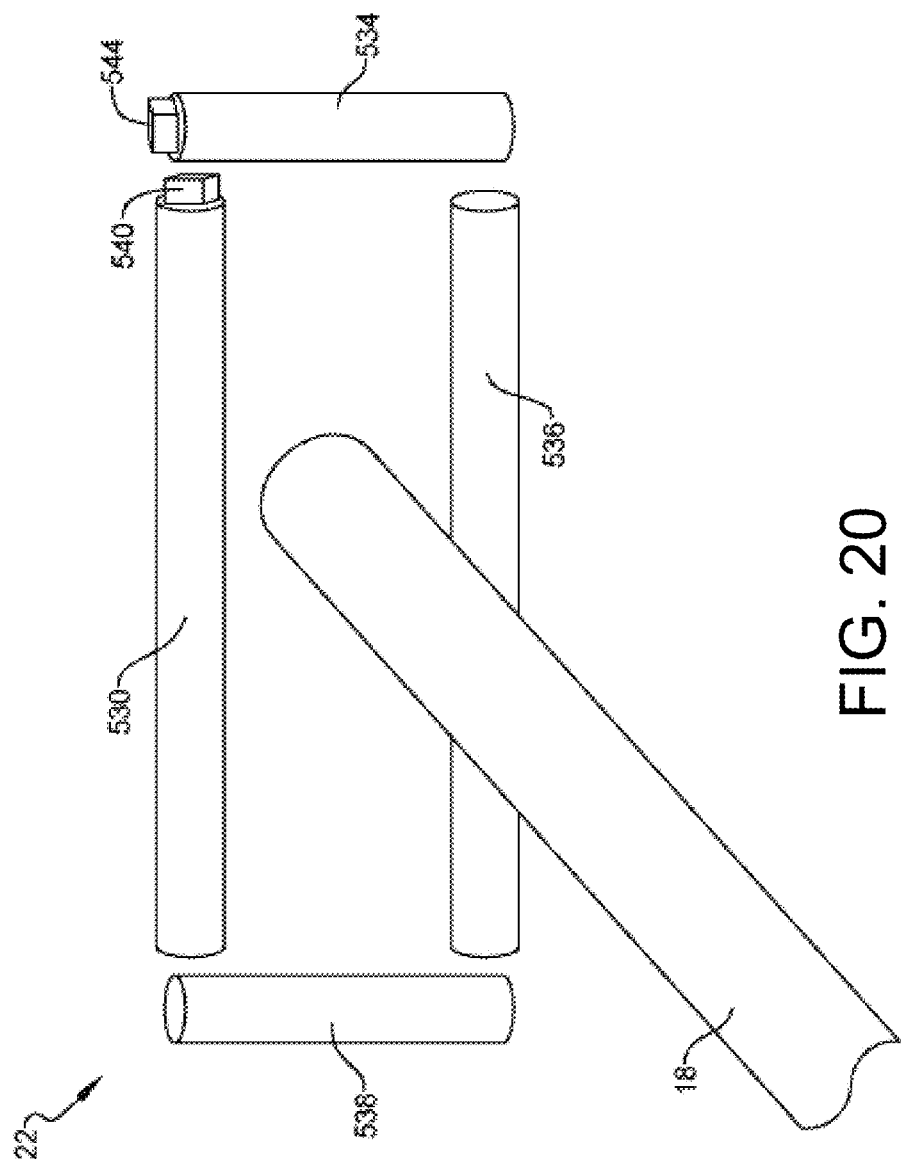
FIG. 20 is a detailed view of a fair lead and cable of a winch assembly.

With continuing reference to FIG. 19 and FIG. 20, the fair lead 22 may include one or more portions, such as an upper or top roller 530 and a first side roller 534. It is understood that the fair lead may include additional portions such as a lower roller 536 and a second side roller 538. In various situations, the cable 18 may be let out of the winch assembly 20 and anchored to the anchor 520. Based upon the relative position of the anchor point 520 and the vehicle 12, the cable 18 may apply pressure or force to selected portions of the fair lead 22, such as the upper roller 530 and the first side roller 534. The respective rollers may include respective pressure sensors, such as a first or upper pressure sensor 540 and a second or side pressure sensor 544. It is understood that all of the rollers may include respective pressure sensors and the first and second pressure sensor 540, 544 are illustrated merely for the current discussion. The respective pressure sensors 540, 544 may provide a signal from the fair lead 22 to the processor assembly 34 that may be communicated via the CAN bus 46 or other appropriate communication system. It is understood that other appropriate sensors may also be provided such as encoders or the like that may be used to determine which of the fair lead rollers, such as the roller 530 and roller 534 are rotating rather than the other rollers 536, 538. Regardless of the type of sensor the fair lead 522 may be used to sense position of the cable 18 relative to the winch assembly 20 and, therefore, other portions of the vehicle 12.

As the winch control assembly 10, according to various embodiments, may include information regarding force applied to the cable 18, length of the cable 18 let out, and position of the anchor point 520 relative to the vehicle 12 based upon sensors from the fair lead 22, the processor 34 may execute instructions to determine how to light an area with the auxiliary lights 510 and/or headlights 500 of the vehicle 12. As discussed above, the vehicle systems may be augmented or adapted based upon operation of the winch assembly 20. Accordingly the auxiliary lights 510 may articulate or be automatically moved based upon positioning of the cable 18 through the fair lead 22 due to the sensors 540, 544. For example, the auxiliary lights 510 may be mounted to the vehicle 12, such as the auxiliary bar 514, with articulation portions. Selected motors or movable portions may move the auxiliary light 510 to aim a portion or all of the light from the auxiliary light 510 at or near the anchor point 520. Accordingly, the auxiliary light 510 may be operated to provide a majority of the light in a cone or area 560 rather than in a larger or forward view 566. The aiming and/or focusing of the light from the auxiliary light 510 may allow for a more intense light to be provided to the selected position, such as the anchor point 520, rather than a more general illumination. Thus, during low visibility operation of the vehicle 12 and/or the winch 20, the anchor point 520 may be more easily viewed by the user. The sensors on the fair lead 22 may be used to determine the position of the anchor 520 relative to the winch 20 and the vehicle 12 to assist in operation of the auxiliary lights 510 relative to the anchor 520.

The auxiliary lights 510 may be moved or focused to the anchor point 520, or any appropriate point, according to various mechanisms. The auxiliary lights 510 may include a plurality of light emitting diode (LED) members or elements that may operate at a maximum power or lumen when all of the LED elements are illuminated. By minimizing or focusing a number of LED elements, individual LED elements may be operated at a higher power for a selected period of time. Additionally, or alternatively thereto, the auxiliary lights 510 may be moved with selected mechanisms and motors to focus an emitted light toward a selected position, such as the anchor 520. Various movable light systems and/or control systems include those disclosed in U.S. patent application Ser. Nos. 16/560,588; 16/560,692; and/or 16/560,710, all of which are hereby incorporated by reference.

Thus the winch assembly 20, including the fair lead 22, may be used to determine a position for operating the auxiliary lights 510 and/or other lights of the vehicle 12, in selected situations such as positioning or focusing an emitted light at a selected point, such as the anchor point 520. By illuminating the anchor point or a selected point with more light a user may view the anchor point or a selected point with greater ease.

As discussed above, the system or control system, such as the control system 10, may include various portions that allow for operation or selected control of the winch motor 62. The winch motor may be controlled based upon various inputs communicated to the winch motor 62, such as from various sensors, such as the current sensor 120, or other sensor such as a gear position sensor switch 50. As further discussed above, various other systems of the vehicle 12 may also be provided and/or communicate with various portions of the control system 10, such as via the processor system 34.

Figure 21:
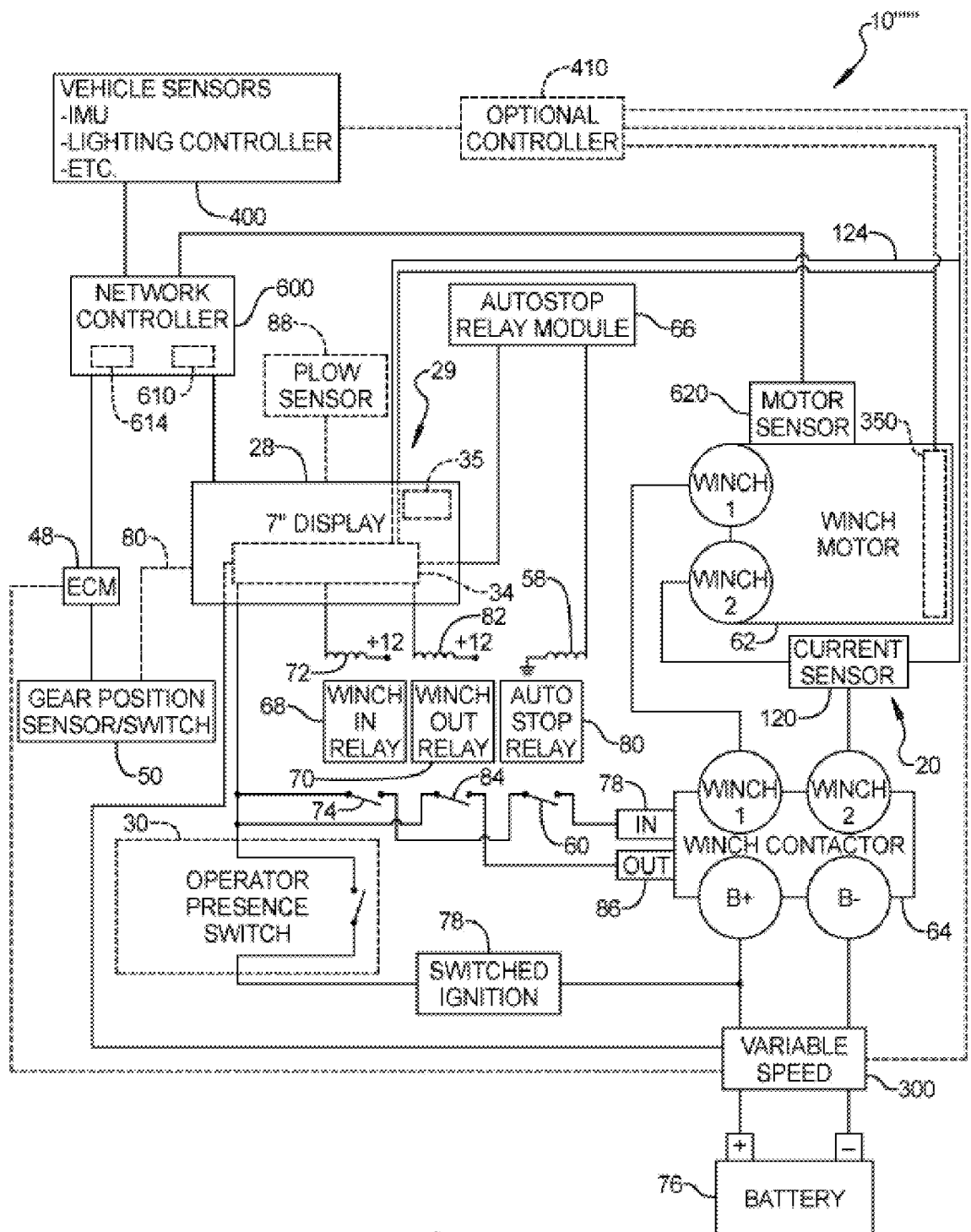
FIG. 21 is a schematic of a control system for a winch assembly, according to various embodiments.

As also discussed above, various communication systems can be provided in the vehicle 12. Communication systems include the CAN bus 46 or other appropriate communication systems. Turning reference to FIG. 21, a control system 10'''' may be used to control various portions of the winch system, including the winch motor 62. The system 10'''' may also operate the controller of the motor 62 such as a variable speed or motor control 300 and other appropriate communication systems.

In various embodiments, the control system 10'''' may include a network controller 600 that may be in communication with various or all other systems of the vehicle 12. For example, various vehicle sensors, including the ECM may communicate with a network controller 600, various sensors such as lighting controllers, suspension adjustment controllers, and other vehicle sensors or controllers 400 may also be in communication with the network controller 600. The network controller 600 may communicate with the display module 29, which may include the processor 34. Further, the network controller 600 may include an internal processor or control system 610. The processor 610 may include internal memory or may be in communication with a separate memory 614 that may be incorporated into the network controller 600. The network controller 600, therefore, may be used to control the winch motor 62 in various ways based upon inputs from the other sensors of the vehicle 12, such as the vehicle sensors 400, and/or the user via the display module 29.

As discussed above, the display module 29 may include various users inputs, such as the hard buttons of the display module 29 and/or various soft buttons 27 that may be used to provide input to the control system 10''''. The user, therefore, may be able to selectively control the winch motor 62 based on various information provided to the user, such as based upon torque, power, temperature, or the like due to information received by the network controller 600 and/or displayed with the display 28 of the display module 29. As discussed above various, sensors may be included with the winch motor 62, in various embodiments, such as a brushless winch motor. The system 10'''' may also include further motor sensors 620 that may be connected or incorporated with the winch motor 62. The motor sensors 620 may include temperature sensors, torque sensors, or the like. Further, as discussed above, the current sensor 120 may also be incorporated or be in line with the motor 62. Accordingly, the winch motor 62 may include an incorporated controller that may also include sensors or control mechanisms, as discussed above, and/or include additional sensors such as the motor sensors 620 (which may include the current sensor 120). Accordingly, the network controller 600 may receive information from various sensors including those associated directly with the winch motor 62 and/or with other portions of the vehicle 12.

The network controller 610 may, therefore, display the information for use or viewing by the user with the display 28 of the display module 29. The user may then operate the winch motor 62 based upon the information displayed with the display module 29. Further the network controller 600 may include various instructions that may be used to control the winch motor 62 and/or other systems of the vehicle 12.

The network controller 600 may operate or alter operation of the winch motor 62 based upon receiving inputs from various other systems, such as the vehicle sensors 400. For example, the network controller 600 may operate the winch motor 62 at a selected power based upon signals (e.g. operation signals) from other systems, such as lighting systems, engine control systems, or the like. Further, or in addition thereto, the network controller 600 may override inputs from the user for control of the winch motor, such as disengaging lighting systems to ensure an appropriate voltage from the battery 76, may also be provided.

The network controller 600 may also override input from the user for operation of the winch based upon a sensed voltage from the battery 76, engine speed of the engine 13, or other systems. The controller 600 may also operate various vehicle systems based upon inputs from the user, such as the user selecting plow mode. The network controller 600 may operate or change settings of systems of the vehicle 12 when the plow mode is selected, such as setting a suspension parameter, idle speed, and/or operation or power usage of various auxiliary systems. Similarly, the network controller 600 may operate various vehicle systems based upon the user input for recovery mode, tow mode, or other selections by the user.

Accordingly, the network controller 600 may include various instructions that are stored in a selected memory, such as the memory 614 and/or the memory 35, for execution by a selected processor of the network controller 600, or any appropriate processor. The network controller 600, therefore, may allow for a two way communication between the user (e.g. via the display module 29) and various portions of the vehicle 12, such as the engine 13 and/or the winch motor 62. The network controller 600 may allow for receiving information from various sensors or controllers of the vehicle 12 and to allow for modification of operation of the various systems of the vehicle (e.g. lighting and/or engine) based upon a user selection of the operation of the winch system 10″″. The communication with the network controller 600 may also be substantially between the winch motor 62 and other vehicle systems or sensors 400 to alter operation of the winch motor 62 and/or vehicle systems based on selected instructions and inputs (e.g. signals from vehicle sensors 400). Also the network controller 600 may override portions or all of inputs from the user based upon user selection for operation of the winch motor 62 and/or current conditions and/or parameters of the vehicle 12. Accordingly, the network controller 600 may allow for a preprogrammed or preselected operation of the winch motor 62 and/or portions of the vehicle 12 based upon inputs from the user and/or preprogrammed inputs or parameters.

Figure 22:
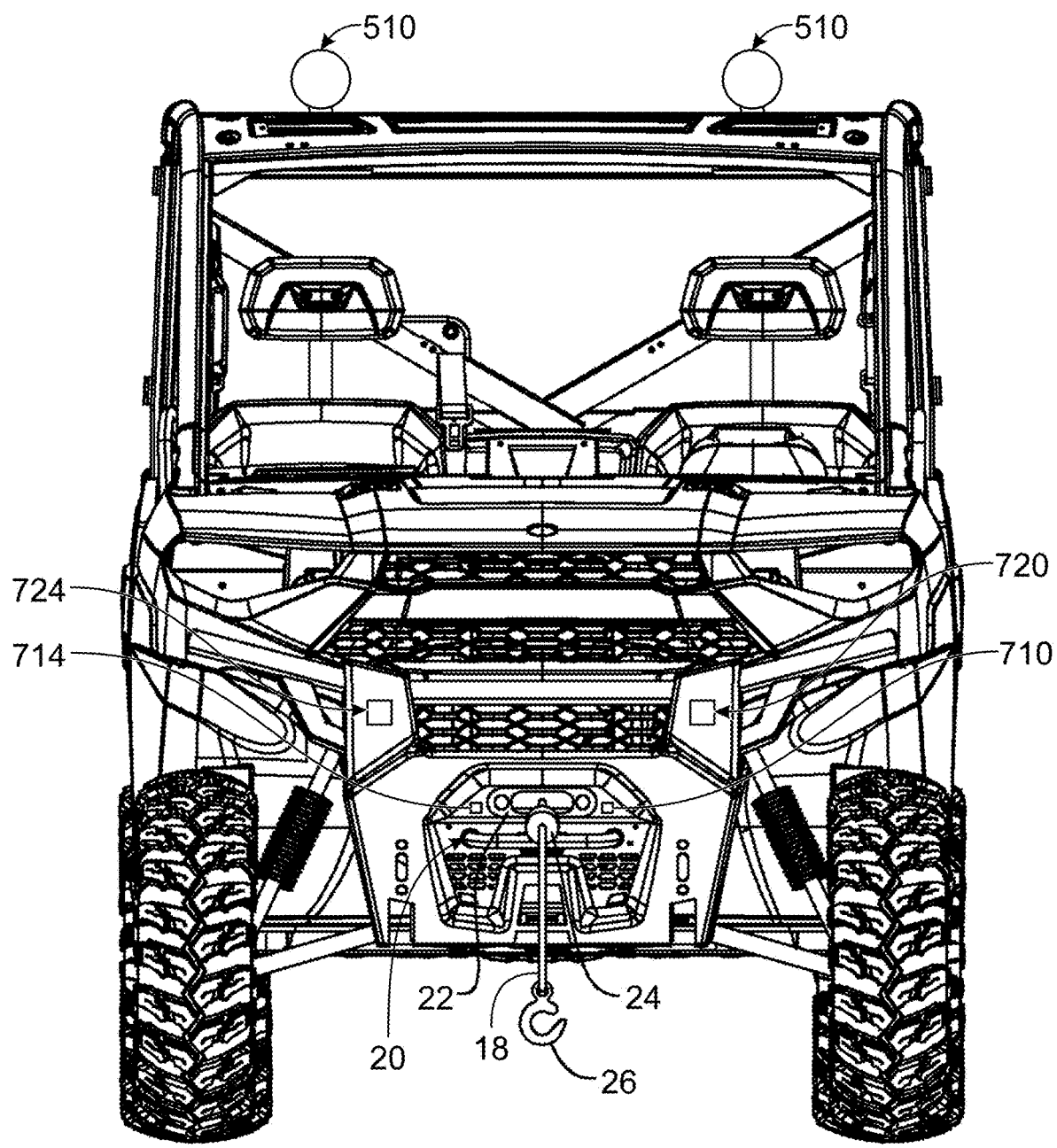
FIG. 22 is a front elevation view of a vehicle and winch assembly, according to various embodiments.
Figure 23:
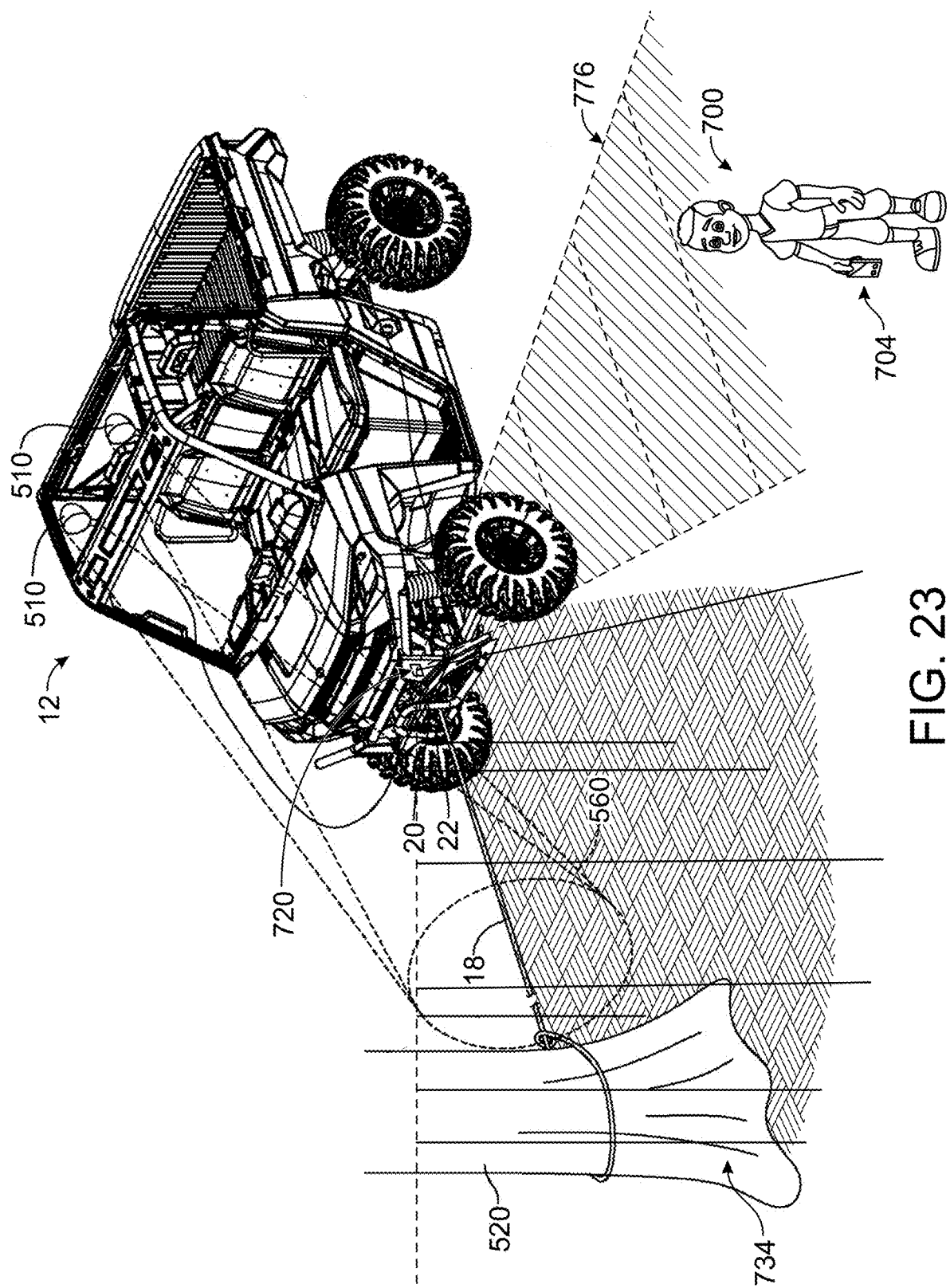
FIG. 23 is an environmental view of a vehicle and winch assembly and indicators relative thereto, according to various embodiments.

Turning reference to FIGS. 22 and 23, the vehicle 12 may include the winch assembly 20 from which the line 18 may extend. The line 18 may be connected to an appropriate anchor point, such as the anchor point 520, as illustrated in FIG. 23. The anchor point 520 may include a selected object, such as a tree, substantially immovable rock, stake, or other vehicle. The lead 18 may be anchored to the anchor point 520 for various purposes, such as assisting in moving the vehicle 12 from a selected location, moving the anchor point which may be movable relative to the vehicle 12, or other appropriate purposes. Nevertheless, during operation of the winch assembly 20, a subject 700, who may a user or another observer, may be present. The user 700 may operate the winch assembly 20 in any appropriate manner, such as with a remote controller 704. The remote controller 704 may be wired or wireless to control the winch assembly 20. Accordingly, the user 700 may be positioned exterior to the vehicle 12 and in view of the anchor point 520, the winch assembly 20, and the line 18. The user 700, therefore, may be in the position to be near or contacted by the line 18 and/or the anchor point 520 if the anchor becomes dislodged, but the vehicle 12 does not move.

The winch assembly 20 when operated by the user 700, such as with the remote 704, or any other appropriate control system, may apply a force to the anchor point 520. Upon the application of the force, the vehicle 12 may move relative to the anchor point 520, the anchor 520 may move relative to the vehicle 12, and/or the cable 18 may move relative to either the anchor 520 and/or the vehicle 12. The most likely areas in which any of the systems or portions may move, however, may be known or calculated relative to the winch assembly 20. In various embodiments, therefore, indication signals may be provided to the user 700 regarding positions where one of the portions of systems are likely to move if the lead 18 disconnects from the anchor, the anchor moves, etc. The positions may be referred to as safe or preferred position zones or areas.

The indication signal may be provided relative to the winch assembly 20. In various embodiments, a first or left indicator 710 may be provided on the winch assembly 20 and/or a right indicator 714 may be provided on the winch assembly 20. It is understood that other indicators may also be provided such as a secondary or vehicle indicator 720 and/or a vehicle indicator 724. Further, lights or other members of the vehicle 12 may be provided such as the auxiliary light assemblies 510.

Each of the indicators, according to various embodiments, may emit a signal. The signal may be a light signal, such as a color or pattern. For example a green light color, a flashing light, or other indicator signal may be emitted by the indicators.

As illustrated in FIGS. 22 and 23, as the user 700 operates the winch assembly 20, the indicators may provide an indication signal, such as an illumination of various areas relative to the winch assembly 20. For example, an area at substantially 90 degrees relative to the fair lead 22, may be illuminated with a selected indication signal that may indicate a preferred standing or location area or region 730. A non-preferred region 734 may also be illuminated, such as with a second or different color and/or flash rate. In various embodiments, the various indicators may be provided to illuminate or not illuminate the preferred area 730 and/or the non-preferred area 734. For example, the indicator 710 may include a selected lens to illuminate the preferred area 730 in a green color and the non-preferred area 734 in a red color. In various embodiments, the preferred area 730 may be illuminated while the non-preferred area 734 is unilluminated. Accordingly, the indicators, including the indicator 710, the indicator 720, or any appropriate indicator may illuminate or not illuminate selected regions relative to the winch assembly 20.

The indication areas 730, 734 may be created relative to the winch assembly 20 due to various lens assemblies of the indicators, such as the indicator 710, 720. Additional or alternatively, positioning of the indicators, including a plurality of indicators directed at different areas or regions relative to the winch assembly, and/or the like, may also be used to provide the different indication signals in the different areas.

Regardless of the mechanism for creation of the signal, the various regions 730, 734 may be indicated with appropriate an indicator signal during operation of the winch assembly 20. During powering of the winch assembly 20, the indicators may illuminate the preferred region 730 and not illuminate the non-preferred region 734 and/or illuminate the different regions 730, 734 with different colors to provide an indication or signal to the user 700 regarding the preferred positioning during operation of the winch assembly 20. The indication, as noted above, may be provided in any appropriate manner including colors, illumination types (e.g. blinking, brightness, etc.) and may be provided during the operation of the winch assembly 20 to provide an indication to the user 700.

The vehicle 12, as discussed above, may include the winch assembly 20 associated therewith. The winch assembly 20 may be included in the vehicle assembly 12 according to various configurations, including those discussed above such as the winch assembly 20 illustrated in FIG. 8. Generally, the winch assembly 20 may be operated in association with various sensors and/or switches including various controls for operation of the winch motor 62 of the winch assembly 20. In various embodiments, the winch assembly 20 may be incorporated into the vehicle 12 for operation by a user, such as the user 700, with control or control assistance within the vehicle 12 and/or remote control systems, such as the remote control 704. The winch assembly 20 may be mounted to an exterior of the vehicle 12, including at predetermined and/or designed mounting positions and mechanisms or custom fabricated mounting positions.

Figure 24:
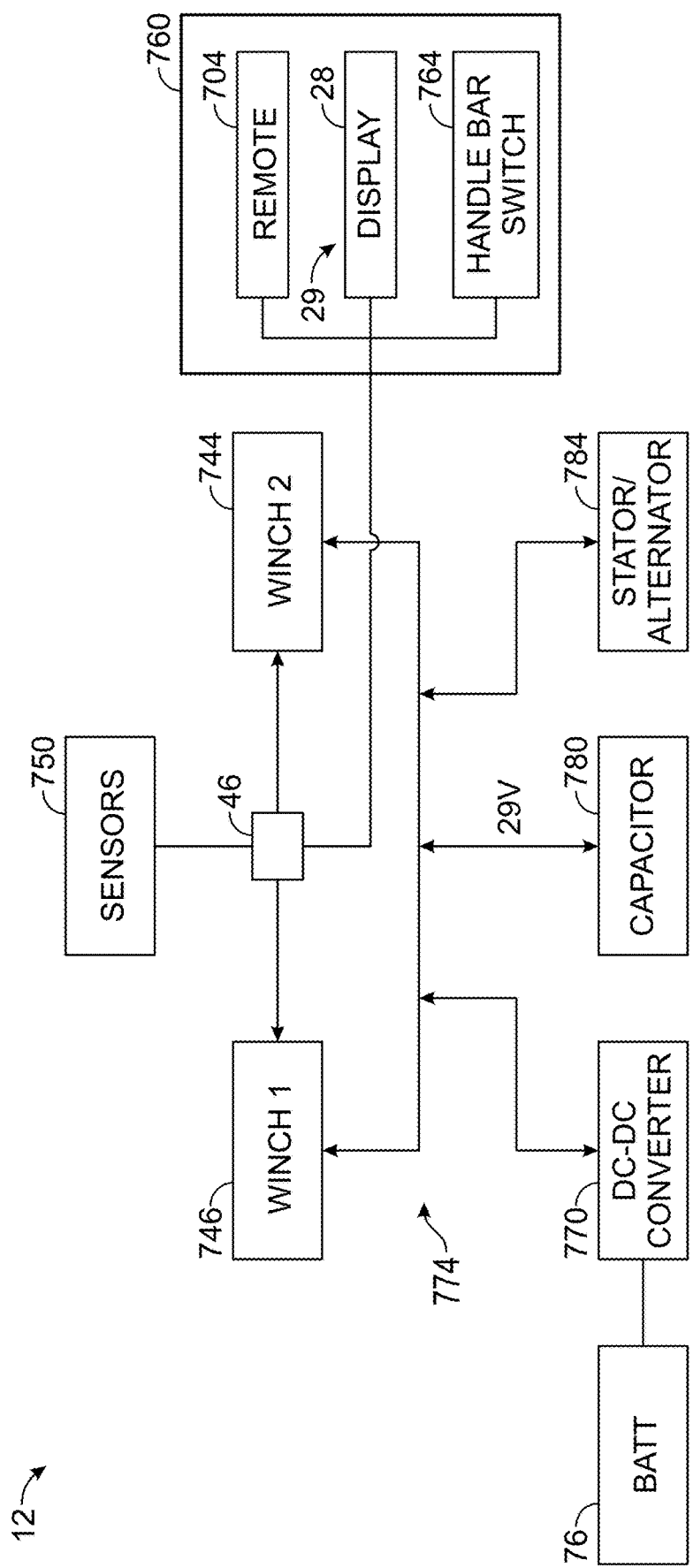
FIG. 24 is a schematic diagram of a multiple winch assembly, according to various embodiments.
Figure 25:
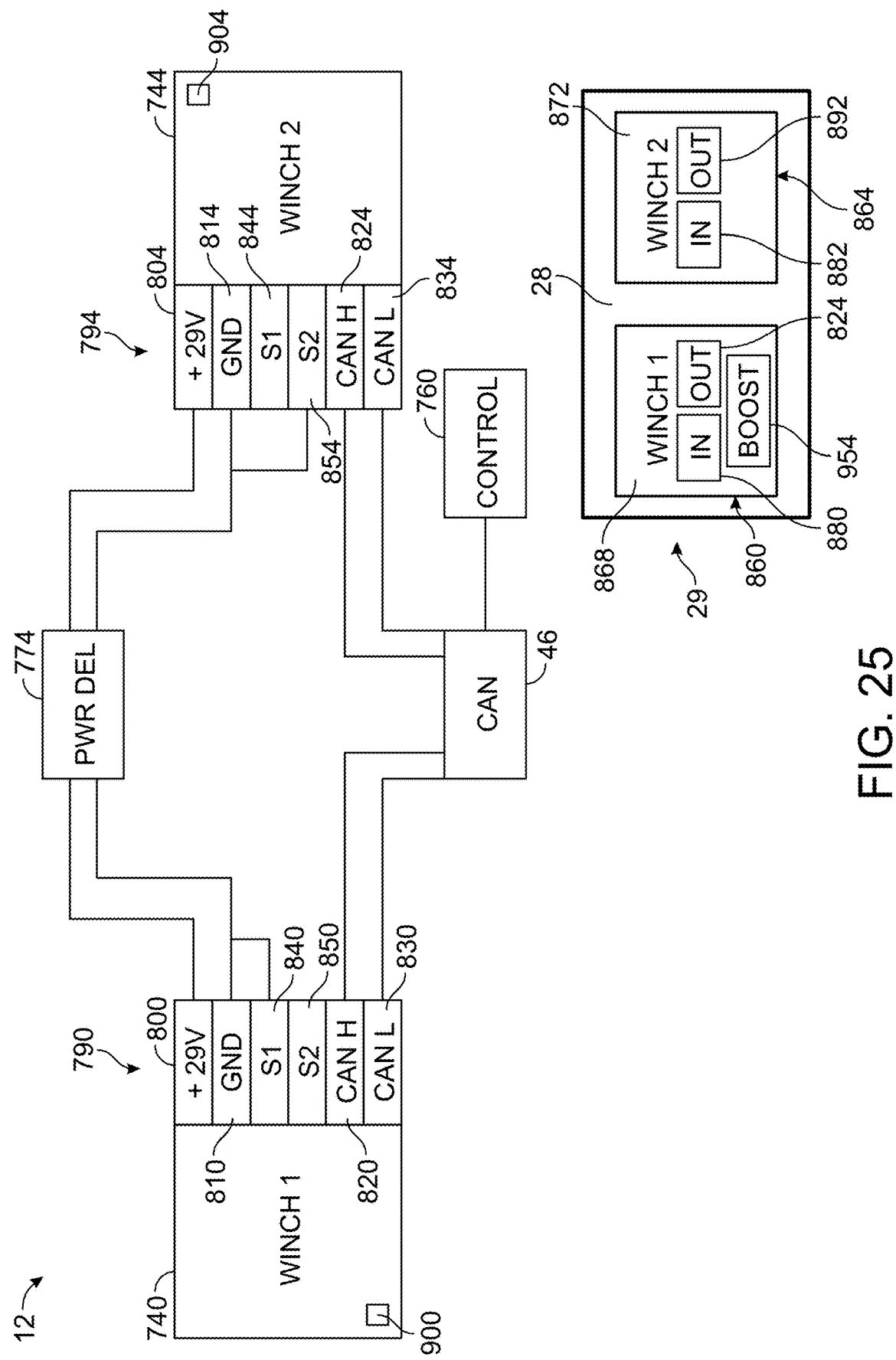
FIG. 25 is a schematic view of a multiple winch assembly and controls therefore, according to various embodiments.

In various embodiments, as illustrated in FIGS. 24 and 25, the vehicle assembly 12 (schematically illustrated) may include a plurality of winch assemblies, such as a first winch assembly 740 and a second winch assembly 744. The two winch assemblies 740, 744 may be interconnected and communicate with one another and/or a controller 760 within the vehicle 12, such as with the CAN bus 46. The CAN bus 46 may be incorporated in the vehicle 12 to assist and/or provide communication between various assemblies, such as the first winch assembly 740 and/or the second winch assembly 744. The CAN bus 46 may also provide communication with various other portions, such as the display module 29. As discussed above the CAN bus 46 may also allow for communication with various other systems within the vehicle 12 and/or from any appropriate system to either the winch assembly 740, 744 and/or the display module 29.

In various examples, the CAN bus 46 may allow for communication with one or more sensors 750 within the vehicle assembly 12. The sensor 750 may include any appropriate sensor, including the sensors discussed above. In various embodiments, the sensors may include the operator switch or sensor 30, the gear position switch 50, or other appropriate sensors. It is understood that the sensor 750 may be any appropriate sensor and may be used to communicate various conditions for operation of either or both of the winches 740, 744.

Further, the CAN bus 46 may allow for communication with one or more control assemblies 760. As discussed above the control assemblies may include the display module 29, which may include the display screen 28 that includes a touch display that can include various soft and changeable buttons or control switches. Accordingly, the display module 29 may be used to operate or control one or both of the winches 740, 744. Further, the controls 760 may alternatively or additional include the remote control 704. The remote 704 may allow for control of one or more of the winches 740, 744 from a selected location such as within the vehicle 12 and/or exterior to the vehicle 12. As illustrated in FIG. 23, for example, the remote 704 may be used to operate the winch 20, which may be either of the winches 740, 744, at a selected location exterior to the vehicle 12. Further, various additional switches or controls may include a handle bar switch 764. The handle bar switch 764 may include a toggle switch for selecting one or both of the winches 740, 744 and/or operation of the winches 740, 744. The handle bar switch, therefore, may include two switches and/or selectors for selecting at least one of and also operation of one or more of the winches 740, 744.

The communication from any of the appropriate controllers 760 to operation or for operation of one or more of the winches 740, 744 may be via the CAN bus or other appropriate communication system 46. Appropriate communication systems can include those discussed above. Similarly sensor inputs from the sensor 750 may also be provided with the CAN bus 46 to one or more of the winches 740, 744 and/or to the controls 760. Further, as also discussed above and herein, communication between various components, such as within the vehicle 12, may occur according to other protocols such as wireless (WiFi® and/or Bluetooth® wireless protocols) and/or other wired protocols or systems. For example, the display module may communicate wirelessly with one or more of the winch assemblies.

The control or power system may include a power storage device, such as the battery 76. The battery 76 may be interconnected with a power supply system or transfer system 774 to the winches 740, 744, such as through a DC to DC converter 770. The winches 740, 744 may include a DC brushless motor winch, and/or a permanent magnet AC motor (which may include an electronic controller), as discussed above. It is understood, therefore, that the DC to DC converter may not be included and that other appropriate conversion systems may be provided to supply an appropriate power to the winches 740, 744.

The power supply system 774 may include a supply line or assembly through which the power supplied to the winches 740, 744. The power supply system 774 may, therefore, include selected systems such as selected capacitors 780. The capacitors 780 may also be referred to as ultra- or high-voltage capacitors, which may receive power from the battery 76, such as through the power system 774, and further such as through the DC to DC converter 770. The capacitor 780 may store, maintain, and/or deliver power at a selected type to the winches 740, 744.

In various embodiments, the capacitors 780 may deliver power at 29 volts (V) to the winches 740, 744. As is understood by one skilled in the art a higher or greater voltage may be delivered to the winches 740, 744 to obtain a greater power or torque to the winch motor, such as the winch motor 62 of either or both of the winches 740, 744. Thus, the winches 740, 744 may be smaller than winches that operate at 12 V or lower voltage than 29 V.

The power deliver system 774 may deliver power from the battery 76 to the winches 740, 744, such as through or with the capacitor 780 (e.g., after charging the capacitors 780). Further, the power delivery system 774 may deliver power from a stator and/or alternator 784. The stator or alternator in the vehicle 12 may be used to generate power at a selected time for operating or powering the winches 740, 744. The power delivery system 774 may provide the power to the winches 740, 744, such as through the capacitor 780, from the alternator/stator power generator 784. It is understood that any appropriate power generator may be provided and may include appropriate controllers for delivering power through the power deliver system 774 to one or more of the winches 740, 744.

With continuing reference to FIG. 24 and additional reference to FIG. 25, the winch assemblies 740, 744 that may be incorporated in the vehicle 12 may include various connections to the components or assemblies as discussed above. For example, each of the winches 740, 744 may have respective plugs or connectors 790, 794. Each of the respective plugs or connectors 790, 794 may include one or a plurality of connections (e.g., pins) or switches. For instance each of the connectors 790, 794 may include a power in 800, 804, respectively. Further, each of the connectors 790, 794 may include a ground 810, 814, respectively. Each of the power supply 800, 804 and the ground 810, 814 may be interconnected or included with the power delivery system 774, as discussed above and illustrated in FIG. 24. The connectors 790, 794 may further each include a CAN high 820, 824 and a respective CAN low 830, 834. Each of the CAN high and CAN low connections 820, 824, 830, 834 may communicate through the CAN bus 46 with one or more of the controllers 760, as also discussed above. Accordingly, the CAN system 46 may control the respective winches 740, 744 through the plug or pin assemblies 790, 794. Further, power may also be supplied to one of the respective and/or both of the winch assemblies 740, 744 through the respective plug assemblies 790, 794.

Each of the plug assemblies 790, 794 may include one or more connectors or pins such as a respective first pin (S1) 840, 844 and a second pin (S2) 850 and 854, respectively. As illustrated in FIG. 25, the first pin S1 and the second pin S2 may be connected through respective grounds 810, 814 of the pin assembly 790, 794. Therefore, as illustrated in FIG. 25, where S1 840 is connected to ground 810 and S2 854 is connected to ground 814. The CAN bus 46 can communicate the detected voltages or the presence of a voltage at the respective pin assembly 790, 794. The voltage detection may be used to determine a presence of one or more of the winch assemblies 740, 744 and/or a control signal send to the respective winch assemblies 740, 744 and/or a return signal therefrom. Accordingly, as illustrated in FIG. 25, the controller 760 may be able to communicate directly with the winch 740 separately from a communication with the winch 744 due to identification of the signal of the voltage related to the respective winch assembly 740, 744. In various embodiments, the voltage signal may be differentiated between the two winch assemblies 740, 744 and/or a presence of a signal may be used to identify the presence of a winch.

As illustrated in FIGS. 24 and 25, the controls 760 may include the display module 29. The display module 29 may include the display screen 28, as discussed above. According to various embodiments, the display screen 28 may display an identification of the winch to be, such as winch 1, winch 2, front winch, rear winch, etc. Thus, the display screen 28 may display a winch 1 control user interface or experience 860 and a winch 2 user interface or user experience 864. Each of the UI's 860, 864 may include an identification 868, 872 of which winch the control UI is for and respective control buttons therefore. For example, the winch 1 UI 860 may include respective IN and OUT buttons 880, 884 and the winch 2 UI 864 may include respective IN and OUT buttons 888 and 892. Therefore, the user, such as the user 700 may view the display screen 28 and identify which of the winch assemblies 740, 744 is to be operated and then operate them according to the respective UI's 860, 864. Thus, the winches may be operated independently of one another and the user 700 may understand which winch assembly is being operated.

Further, the control systems 760 may ensure that only a single one of the winch assemblies 740, 744 is being operated to reduce and/or eliminate draw overload and/or maintain a selected draw within the electrical system of the vehicle 12. Further, the user 700 may be able to identify and operate a specific one of the winch assembly 740, 744 separately and independently of the other winch assembly for various purposes. For example, the winch 1 assembly 740 may be connected to the front of the vehicle 12 while the winch 2 assembly 744 is connected to the rear of the vehicle. The vehicle 12 may be connected to the anchor, such as the anchor 520, and operating the first winch assembly 740 may allow for recovery of the vehicle 12. Operation of the second winch assembly 744 may be counterproductive and/or overload the system if allowed to operate simultaneously with the first winch assembly 740. Thus, the communication system, such as through the CAN bus 46, may be used to identify which winch assembly is to be operated and controlled and/or the operation of the respective winch assemblies.

Each of the winch assemblies 740, 744 may include selected sensors such as power sensors, overload sensors, temperature sensors, or the like. These may communicate through the CAN bus 46 to the controller 760. The respective sensor signals may be relative to the individual one of the winch assemblies 740, 744 and, therefore, the control 760, such as the display screen 28, may also provide an indication of operation and/or warnings to the user 700. Thus, a first sensor 900 associated with the winch 1 740 and a second sensor 904 associated with the winch 2 744 may provide a sensor signal through the CAN bus 46 to the controller 760. The sensors 900, 904 may be any appropriate sensor, such as those discussed above, such as the sensor 350 (FIG. 14). The controller 760 may include appropriate processors to analyze a sensor signal for providing an input or output, such as a display on the display screen 28, prior to, during, or after operation of the respective winch assemblies 740, 744. Further, the identification signal may be used to identify which winch assembly the sensor signal is from to allow for a specific output or display of the sensor signal on the display device 29.

As discussed above, the winch assembly may include any appropriate winch, such as the Polaris® HD winch assembly. The winch assembly, according to various embodiments, may include an electric motor. The electric motor may include the motor 62, as discussed above and herein, which may be connected directly to the battery 76, connected to the battery 76 through an appropriate power delivery system, such as the power delivery system 774 or other appropriate systems, and/or to an electrical system of the vehicle 12. As is understood by one skilled in the art, the battery 76 may provide power to other portions of the vehicle 12, such as a start motor for starting the vehicle 12 and other systems. Further, as discussed above, the battery 76 may provide power to one or more of the winch assemblies 20, including the winch assembly 20 and/or the dual winch assemblies 740, 744. Accordingly, the electrical components of the vehicle 12 may be connected to the battery 76 as may be one or more of the winches. Thus, the battery 76, or other appropriate energy storage device may be connected to the winch assembly to provide power thereto. However, operation of the winch, such as in a power generation mode, may provide power to the battery 76 and/or other electrical components of the vehicle 12.

As is understood by one skilled in the art, the winch assembly, such as the winch assembly 20, may include an electrical motor such as a brushless motor, three phase power motor, or the like which may include windings or coils and magnets that move relative to one another. When powering or driving the motor of the winch assembly 20, as illustrated in FIG. 13, may be operated to rotate the spindle 360 on which the cable or cord 18 is wound. The operation of the motor 62 may cause movement of the spindle 360 to let out or draw in the cord 18. In a power generation mode, however, movement of the cable 18 may cause movement of the spindle 360 which may also, therefore, cause movement of portions of the motor 62. The motor, however, may be operated in the power generation mode due to movement of the spindle 360 to generate an electrical current and provide energy back to the electrical system of the vehicle 12, including the battery 76. Accordingly, the winch assembly 20 may be used to move the cable 18 by powering the motor 62 in a winch mode, such as those discussed above, and/or in a power generation or power boost mode by movement of the cable 18 to move the motor 62 to generate power and return it to the vehicle 12, such as to the battery 76.

Figure 26:
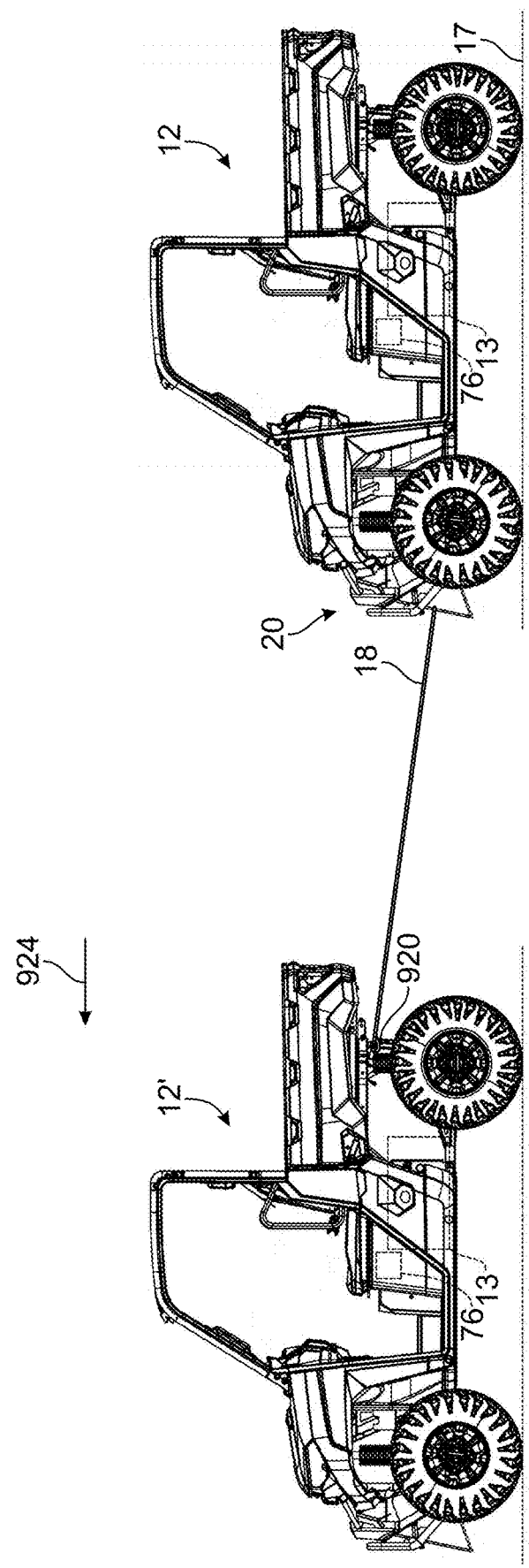
FIG. 26 is an environmental view of a vehicle and winch assembly, according to various embodiments.

With reference to FIG. 26, for example, the vehicle 12 (also referred to as a main vehicle) may be positioned relative to a second vehicle 12' (also referred to as a boost vehicle). The two vehicles 12, 12' may both be the same type of vehicle or each be different vehicles. As illustrated in FIG. 26, the two vehicles 12, 12' may be side-by-side off-road vehicles. In various embodiments, however, either or both of the vehicles may be sit on top ATV's, two-wheeled vehicles, over or on the road vehicles, or the like. Regardless, either or both of the vehicles, such as the vehicle 12, may include the winch assembly 20. As discussed above, the winch assembly 20 may include the line or lead 18. The lead 18 may be connected to the second vehicle 12', such as to any appropriate anchor point 920. The anchor point 920 may be any appropriate anchor point that may receive a connection from the lead 18. Accordingly, the vehicle 12' may move relative to the vehicle 12 and move the lead 18 therewith when connected at the anchor point 920. In various embodiments, for example, the second vehicle 12' may move generally in the direction of arrow 924 which may be away from the vehicle 12. The vehicle 12 may include the engine 13 and the battery 76, as discussed above. Further, the vehicle 12 may include the various connections between the winch assembly 18, including the motor 62, and either or both of the battery 76 and/or the engine 13.

With continuing reference to FIG. 26 and additional reference to FIG. 13, as discussed above, the winch assembly 20 includes the motor 62. The cable 18 is wound around the spindle 360 which is connected to the motor 62. Various encoders and other sensors may be provided relative to the motor 62 and the motor 62 may be connected to the various systems of the vehicle through a connection line or cable 930. As illustrated in FIG. 26, as the second vehicle 12' moves generally in the direction of arrow 924, the lead 18 is be drawn out from the winch assembly 20 which, as discussed above, would cause the spindle 360 to rotate. The spindle 360 may generally rotate along a long axis 934 generally in the direction of arrow 938.

The rotation of the spindle 360 may cause rotation of the motor 62. The spindle 360 may be connected directly to the motor 62 and/or through a gear assembly mechanism. Nevertheless, the motor 62 may include a permanent magnet or electromagnets and coils. Rotation of the spindle 360 may rotate portions of the motor 62, such as an armature. Rotation of the armature may cause a current to be formed in the coils of the motor 62. The current formed in the coils of the motor 62 may be driven along the cable 930 to appropriate portions of the vehicle 12, such as the battery 76. As discussed above, the battery 76 may be connected directly to the winch assembly 20 and/or through various power delivery mechanisms and systems. Accordingly, the current may be driven through the cable 930 from the motor 62 to any appropriate portion and may be stored in the battery 76.

Accordingly, the driving of the motor 62 by pulling on the lead 18 with the vehicle 12' may allow the motor 62 to act in a generation or boost mode to provide power to the electrical system of the vehicle 12. In various embodiments, power may be transferred to the power storage system including the battery 76, of the vehicle 12.

For operation in a boost mode, as discussed above, the vehicle 12 may generally be fixed in a position by applying a parking brake, a locking gear or the like. Accordingly, the vehicle 12 will remain substantially immobile relative to the surface 17 while the second vehicle 12' moves relative to the first vehicle 12. The second vehicle 12', therefore, may also be referred to as a boost vehicle. The vehicle 12, however, may be caused to move relative to an anchor point, such as of the vehicle 12', the anchor 520, etc.

Generally, when not powered or operating, the winch assembly 20 may have a free spooling configuration and/or a locked or braked configuration. In the free spooling configuration the winch may allow for efficient let out of the lead 18 and/or to ensure appropriate engagement and disengagement of gearing systems and/or the motor 62. In the braked configuration the spindle 360 may be fixed so as not to rotate.

In a boost mode the winch assembly 20 may include an appropriate engaging or connection system to connect the spindle 360 to the motor 62 to allow the spindle 360 to rotate the motor 62 in a power generation mode. The engaging system may include a manual engagement, such as a manual switch or leaver 950 on the winch assembly 20. The manual engagement may be engaged, selectively, to allow for operation of the winch assembly in the boost or power generation mode.

It is understood, however, that the system may include additional and/or alternative engagement systems. For example, the winch assembly 20 may include an internal engagement mechanism that is controlled by the controls 760. In various embodiments, for example, with reference to FIG. 25, the display screen 28 may include a soft button or input 954 that may be a BOOST input button. The winch assembly 20 may then be configured to operate in the boost configuration, such as by applying the engagement and engaging the spindle 360 to the motor 62 to be rotated due to movement of the lead 18. Accordingly, it is understood that the winch assembly 20 may be configured to engage the spindle 360 to the motor 62 to allow for the boost mode due to movement of the lead 18 that moves the spindle 360. The engagement may be either a manual switch, such as the switch or leaver 950, and/or other appropriate inputs, such as the boost control 954.

The winch assembly 20, as discussed above, may include a brushless winch assembly. The winch assembly 20 may, therefore, include various controllers and sensors. The controllers may operate to operate within appropriate parameters for the vehicle 12. The controllers may ensure to limit a current supply to a selected current supply during the boost or power generation mode. For example, the controllers may ensure that the power supply is limited to not more than 50 amperes (A). Thus, the winch assembly 20 including the motor 62 may be operated in the boost mode to provide or generate energy in the vehicle 12. The energy generated may be due to movement of the vehicle 12' relative to the vehicle 12. The generated energy may be delivered to appropriate portions of the vehicle 12, such as the battery 76. Generally, movement of the vehicle 12' relative to the vehicle 12 may be in an appropriate speed during the boost mode, such as about 5 kilometers per hour (kph) to about 12 kph.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a module.

The term code or logic, as used above, may include software, firmware, and/or microcode, and may refer to programs, routines, functions, classes, data structures, and/or objects. The term processor or controller encompasses a single processor circuit that executes some or all code or logic from multiple modules. The processor can encompass a processor circuit that, in combination with additional processor circuits, executes some or all code from one or more modules. References to processor or controller also encompasses multiple processor circuits on discrete dies, multiple processor circuits on a single die, multiple cores of a single processor circuit, multiple threads of a single processor circuit, or a combination of the above. The term memory encompasses a memory circuit that stores some or all code from multiple modules. The term memory also encompasses a memory circuit that, in combination with additional memories, stores some or all code from one or more modules.

The term memory includes computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, a Blu-ray Disc® magneto-optical disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A winch control and/or communication system, comprising:
    a controller having a processor operable to execute instructions;
    a memory module operable to store the instructions for execution by the processor;
    a winch assembly having a winch motor in communication with the controller;
    a sensor configured to sense a parameter relative to the winch motor and operable to transmit a sensor signal regarding the parameter to at least one of the controller or the winch motor regarding the parameter that is relevant to operation of the winch assembly; and
    a winch motor controller separate from the controller;
    wherein the winch motor is configured to operate according to a scheme of a pulse width modulation (PWM) via at least one of (1) the controller executing the instructions and via the communication to the winch motor or (2) the winch motor controller;
    wherein the scheme of the PWM includes a duty cycle having a maximum duty cycle and a ramp up speed to reach the maximum duty cycle, wherein the duty cycle and ramp up speed are selected based on the parameter.

2. The system of claim 1, wherein the sensor includes a current sensor connected between a power source and a winch contactor and the winch motor;
    wherein the current sensor is operable to sense a current to the winch motor.

3. The system of claim 2, wherein the controller receives a current value from the current sensor as the sensor signal;
    wherein the controller is operable to determine a load on the winch motor due to the sensor signal and selectively operate the winch motor.

4. The system of claim 2, wherein the winch motor controller is configured to provide a plurality of duty cycles to the winch motor.

5. The system of claim 4, wherein the controller operates the PWM to provide a first duty cycle of the plurality of duty cycles based at least on the instructions;
- wherein the duty cycle is the scheme of the PWM to provide pulses to the winch contactor to operate the winch motor according to a mode.

6. The system of claim 5, further comprising:
- at least one vehicle system or vehicle sensor;
- wherein the communication system is a vehicle communication system;
- wherein the mode includes a plow mode and a recovery mode;
- wherein the duty cycle includes a plow mode duty cycle with a first pulses and a recovery duty cycle with a second pulses.

7. The system of claim 6, wherein the at least one vehicle system or vehicle sensor is operable to transmit a signal to the controller via the vehicle communication system.

8. The system of claim 7, wherein the controller is operable to control the winch motor based on the signal transmitted via the vehicle communication system.

9. The system of claim 7, wherein the controller is operable to control the winch motor based only on the signal transmitted via the vehicle communication system from the vehicle sensor.

10. The system of claim 1, wherein the sensor includes a rotary encoder associated with the winch assembly;
- wherein the rotary encoder is operable to sense a rotation of at least a portion of the winch assembling including at least one of the winch motor, a winch spindle, or a winch gear.

11. The system of claim 10, wherein the controller receives a rotation speed or number as the sensor signal;
- wherein the controller is operable to determine a load on the winch motor, a length of cable out from the winch assembly, a speed of the winch spindle, or combinations thereof.

12. The system of claim 1, further comprising:
- a light emitting system; and
- a fairlead;
- wherein the sensor incudes a sensor associated with the fairlead.

13. The system of claim 12, wherein the sensor includes a pressure sensor;
- wherein the controller is operable to receive the sensor signal from the pressure sensor;
- wherein the controller is operable to determine a direction of an end of a cable extending from the winch assembly through the fairlead due to the sensor signal;
- wherein the light emitting system is mounted on a vehicle and is operable to direct light at the direction away from the vehicle determined by the controller.

14. A method of controlling a winch assembly having a winch motor, comprising:
- executing instructions with a processor of a controller;
- controlling the winch motor based at least in part on the executed instructions with one of a variable DC-to-DC converter or continuously with a single control scheme as a pulse width modulation (PWM);
- receiving a sensor signal at the controller or the winch motor from a sensor regarding a parameter relative to the winch motor and operable to transmit a sensor signal based on the parameter to at least one of the controller or the winch motor; and
- at least one of (i) operating a winch motor controller separate from the controller or (ii) communicating with the controller via a communication system;
- wherein the scheme of the PWM includes a duty cycle having a maximum duty cycle and a ramp up speed to reach the maximum duty cycle, wherein the duty cycle and ramp up speed are selected based on the parameter; and
- wherein the variable DC-to-DC converter is configured to control the winch motor using a variable output at a power rating determined according to the parameter, the power rating being less than a maximum possible power rating of the winch motor by at least the variable DC-to-DC converter.

15. The method of claim 14, further comprising:
- receiving a current sensor signal from a current sensor as the sensor signal regarding a current to the winch motor.

16. The method of claim 15, further comprising:
- determining a load on the winch motor due to the current sensor signal; and
- selectively determining operation of the winch motor based on the determined load.

17. The method of claim 14, wherein the pulse width modulation winch motor controller is configured to provide a plurality of duty cycles to the winch motor; and
- operating the winch motor according to a first duty cycle of the plurality of duty cycles based at least on the executed instructions.

18. The method of claim 14, wherein the DC-to-DC converter of the winch motor controller is a variable output DC-to-DC converter; and
- operating the winch motor with variable output DC-to-DC converter to provide varying power to the winch motor based at least on the executed instructions.

19. The method of claim 14, further comprising:
- sensing with a rotary encoder is associated with the winch assembly a rotation of at least a portion of the winch assembling including at least one of the winch motor, a winch spindle, or a winch gear; and
- receiving a rotary sensor signal from the rotary encoder sensor as the sensor signal.

20. The method of claim 19, further comprising:
- determining a rotation speed or number of turns with the rotary sensor signal to learn an operation mode of the winch motor.

21. The method of claim 19, further comprising:
- determining a length of cable on a winch spindle based at least on the rotary signal.

22. The method of claim 19, further comprising:
- determining with the controller a load on the winch motor, a length of cable out from the winch assembly, a speed of the winch spindle, or combinations thereof.

23. The method of claim 14, further comprising:
- receiving a signal via the communication system from at least one of a vehicle system or a vehicle sensor;
- wherein the communication system is a vehicle communication system.

24. The method of claim 23, further comprising:
- controlling the winch motor based on the signal transmitted via the vehicle communication system.

25. The method of claim 23, further comprising:
- controlling the winch motor based only on the signal transmitted via the vehicle communication system.

26. The method of claim 14, further comprising:
- operating a light emitting system; and
- receiving the sensor signal from a sensor associated with the fairlead.

27. The method of claim 26, further comprising:
receiving a pressure signal from a pressure sensor as the sensor at the controller;
determining a direction of an end of a cable extending from the winch assembly through the fairlead due to the sensor signal; and
wherein operating the light emitting system includes directing light from the light emitting system to direct light at the determined direction.

28. The method of claim 27, wherein the controller is operable to execute instructions to determine the direction of the end of the cable extending from the winch assembly based on the position and magnitude of the sensor signals.

29. The method of claim 14, wherein communicating with the controller via a communication system includes a network controller, including:
receiving a signal from a vehicle system separate from the winch motor;
executing instructions with the network controller to override a user selected operation of the winch motor based on the received signal; and
transmitting a signal from the network controller to alter operation of the winch motor based on the executed instructions.

30. The method of claim 14, wherein communicating with the controller via a communication system includes a network controller, including:
receiving a signal from a vehicle system separate from the winch motor;
executing instructions with the network controller to alter operation of the vehicle system based on a user selected operation of the winch motor based on the received signal; and
transmitting a signal from the network controller to alter operation of the vehicle system based on the executed instructions.

31. The method of claim 14, wherein operating a winch motor controller separate from the controller includes maintain at least one of (i) operation of the winch motor within a selected parameter or (ii) operating a vehicle system separate from the winch motor based on operation of the winch motor.

32. A winch control and/or communication system of a vehicle, comprising:
a controller having a processor operable to execute instructions;
a memory module operable to store the instructions for execution by the processor;
a winch assembly having a winch motor in communication with the controller;
a sensor configured to sense a parameter relative to the winch motor and operable to transmit a sensor signal to at least one of the controller or the winch motor;
a winch motor controller;
a DC-to-DC converter configured to generate a variable output to control the winch motor;
wherein the winch motor is configured to operate according to the controller executing the instructions via the communication or the winch motor controller to control the winch motor by the variable output at a power rating determined according to the sensor signal, the power rating being less than a maximum possible power rating of the winch motor by at least the DC-to-DC converter.

33. The system of claim 32, wherein the winch motor is a DC motor and the winch motor controller generates the variable output from the DC-to-DC converter.

34. The system of claim 33, wherein the controller operates the variable output DC-to-DC converter to provide varying power to the winch motor based at least on the instructions to control operation of the winch motor including a learned mode of operation based on the received signal from the sensor.

35. The system of claim 32, wherein the sensor is a collision sensor configured to sense a proximity of an external item.

36. The system of claim 32, further comprising:
a light emitting system positioned on the vehicle relative to the winch motor; and
wherein the winch assembly includes a fairlead having a roller;
wherein the sensor includes a pressure sensor associated with the roller;
wherein the controller is operable to receive the sensor signal from the pressure sensor;
wherein the controller is operable to determine a direction of an end of a cable extending from the winch assembly through the fairlead due to the sensor signal;
wherein the light emitting system positioned on the vehicle is operable to direct light at the direction of the end of the cable extending from the winch assembly away from the vehicle determined by the controller.

* * * * *